United States Patent
Kurian

(10) Patent No.: US 10,268,635 B2
(45) Date of Patent: Apr. 23, 2019

(54) SYSTEM FOR DATA ROTATION THROUGH TOKENIZATION

(71) Applicant: Bank of America Corporation, Charlotte, NC (US)

(72) Inventor: Manu Jacob Kurian, Dallas, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 301 days.

(21) Appl. No.: 15/186,079

(22) Filed: Jun. 17, 2016

(65) Prior Publication Data

US 2017/0364893 A1 Dec. 21, 2017
US 2018/0181938 A9 Jun. 28, 2018

(51) Int. Cl.

| G06F 16/22 | (2019.01) |
|---|---|
| G06Q 20/04 | (2012.01) |
| G06Q 20/32 | (2012.01) |
| G06F 17/30 | (2006.01) |
| G06F 16/23 | (2019.01) |
| G06Q 20/38 | (2012.01) |
| G06Q 20/40 | (2012.01) |

(52) U.S. Cl.
CPC ...... *G06F 16/2282* (2019.01); *G06F 16/2255* (2019.01); *G06F 16/2379* (2019.01); *G06F 17/3033* (2013.01); *G06F 17/30339* (2013.01); *G06F 17/30377* (2013.01); *G06Q 20/0425* (2013.01); *G06Q 20/3223* (2013.01); *G06Q 20/385* (2013.01); *G06Q 20/4012* (2013.01)

(58) Field of Classification Search
CPC ......... G06Q 20/00; G06Q 20/04; G06Q 20/24
USPC ........................................ 705/44, 65, 64, 16
See application file for complete search history.

(56) References Cited

U.S. PATENT DOCUMENTS 3,119,103 A 1/1964 Fertig
3,245,915 A 4/1966 Rai et al.
(Continued)

FOREIGN PATENT DOCUMENTS

CN 101599151 A 12/2009
EP 1132876 A2 9/2001
(Continued)

OTHER PUBLICATIONS

Simon, "Credit-Card Reward Programs: A Short History"; Credi; Creditcards.com, Nov. 2006, 4 pages.
(Continued)

*Primary Examiner* — Olusegun Goyea
(74) *Attorney, Agent, or Firm* — Michael A. Springs; Moore & Van Allen PLLC; James C. Edwards

(57) ABSTRACT

Embodiments rotate data by tokenization. Embodiments determine one or more check data fields of a check such as check number and routing number; generate a PIN based on the determined check data fields; receive user input of a user PIN; compare the generated PIN with the inputted user PIN; if the generated PIN matches the inputted user PIN, proceed with the transaction; and if the generated PIN does not match the inputted user PIN, cancel the transaction. In some cases, a point of sale terminal comprising a scanner for scanning the check to determine the one or more check data fields. In some cases, receiving user input of the user PIN comprises receiving, by a communication device of the system from a mobile device of the user, a text message, SMS message or phone call comprising the user input of a user PIN.

20 Claims, 8 Drawing Sheets

(56) References Cited

U.S. PATENT DOCUMENTS

| | | | |
|---|---|---|---|
| 3,254,000 A | 5/1966 | Chibret | |
| 3,256,670 A | 6/1966 | Tersigni | |
| 3,330,546 A | 7/1967 | Bryan | |
| 3,422,462 A | 1/1969 | Finnieston | |
| 3,516,056 A | 6/1970 | Matthews | |
| 3,651,168 A | 3/1972 | Stoessel et al. | |
| 3,658,393 A | 4/1972 | Luthi | |
| 3,718,328 A | 2/1973 | Comstock | |
| 3,748,367 A | 7/1973 | Lamme et al. | |
| 4,630,201 A | 12/1986 | White | |
| 4,766,293 A | 8/1988 | Boston | |
| 5,438,186 A | 8/1995 | Nair et al. | |
| 5,589,271 A | 12/1996 | Watanabe et al. | |
| 5,770,533 A | 6/1998 | Franchi | |
| 5,781,654 A * | 7/1998 | Carney | G06Q 20/04 382/137 |
| 5,884,289 A | 3/1999 | Anderson et al. | |
| 5,892,900 A | 4/1999 | Ginter et al. | |
| 5,949,044 A | 9/1999 | Walker et al. | |
| 6,119,103 A | 9/2000 | Basch et al. | |
| 6,236,981 B1 * | 5/2001 | Hill | G06Q 20/02 380/46 |
| 6,254,000 B1 | 7/2001 | Degen et al. | |
| 6,256,670 B1 | 7/2001 | Davies | |
| 6,330,546 B1 | 12/2001 | Gopinathan et al. | |
| 6,341,353 B1 | 1/2002 | Herman et al. | |
| 6,422,462 B1 | 7/2002 | Cohen | |
| 6,487,540 B1 | 11/2002 | Smith et al. | |
| 6,516,056 B1 | 2/2003 | Justice et al. | |
| 6,536,659 B1 | 3/2003 | Hauser et al. | |
| 6,609,654 B1 | 8/2003 | Anderson et al. | |
| 6,651,168 B1 | 11/2003 | Kao et al. | |
| 6,658,393 B1 | 12/2003 | Basch et al. | |
| 6,718,328 B1 | 4/2004 | Norris | |
| 6,748,366 B1 | 6/2004 | Hurwitz et al. | |
| 6,748,367 B1 | 6/2004 | Lee | |
| 6,748,533 B1 | 6/2004 | Wu et al. | |
| 6,913,194 B2 | 7/2005 | Suzuki | |
| 6,999,943 B1 | 2/2006 | Johnson et al. | |
| 7,031,945 B1 | 4/2006 | Donner | |
| 7,058,806 B2 | 6/2006 | Smeets et al. | |
| 7,082,406 B1 | 7/2006 | Dickson | |
| 7,103,576 B2 | 9/2006 | Mann, III et al. | |
| 7,111,323 B1 | 9/2006 | Bhatia et al. | |
| 7,114,079 B1 | 9/2006 | Cook et al. | |
| 7,136,835 B1 | 11/2006 | Flitcroft et al. | |
| 7,177,838 B1 | 2/2007 | Ling | |
| 7,328,189 B2 | 2/2008 | Ling | |
| 7,337,144 B1 | 2/2008 | Blinn et al. | |
| 7,398,250 B2 | 7/2008 | Blinn et al. | |
| 7,406,434 B1 | 7/2008 | Chang et al. | |
| 7,487,912 B2 | 2/2009 | Seifert et al. | |
| 7,596,516 B2 | 9/2009 | Starkowsky et al. | |
| 7,596,530 B1 | 9/2009 | Glasberg | |
| 7,606,560 B2 | 10/2009 | Labrou et al. | |
| 7,610,040 B2 | 10/2009 | Cantini et al. | |
| 7,627,505 B2 | 12/2009 | Yoshida et al. | |
| 7,657,489 B2 | 2/2010 | Stambaugh | |
| 7,676,432 B2 | 3/2010 | Ling | |
| 7,693,771 B1 | 4/2010 | Zimmerman et al. | |
| 7,698,221 B2 | 4/2010 | Blinn et al. | |
| 7,698,443 B2 | 4/2010 | Yaffe et al. | |
| 7,716,091 B2 | 5/2010 | Ross | |
| 7,739,169 B2 | 6/2010 | Hammad | |
| 7,742,967 B1 | 6/2010 | Keresman, III et al. | |
| 7,783,281 B1 | 8/2010 | Cook et al. | |
| 7,784,684 B2 | 8/2010 | Labrou et al. | |
| 7,810,720 B2 | 10/2010 | Lovett | |
| 7,835,960 B2 | 11/2010 | Breck et al. | |
| 7,848,980 B2 | 12/2010 | Carlson | |
| 7,857,489 B2 | 12/2010 | Zhu et al. | |
| 7,877,288 B1 | 1/2011 | Cunningham et al. | |
| 7,883,007 B1 | 2/2011 | Crews et al. | |
| 7,907,926 B2 | 3/2011 | Rofougaran | |
| 7,929,910 B2 | 4/2011 | Chen | |
| 7,937,107 B2 | 5/2011 | Rofougaran et al. | |
| 7,946,480 B2 | 5/2011 | Miller et al. | |
| 7,962,419 B2 | 6/2011 | Gupta et al. | |
| 7,992,779 B2 | 8/2011 | Phillips et al. | |
| 8,012,219 B2 | 9/2011 | Mendez et al. | |
| 8,031,207 B2 | 10/2011 | Phillips | |
| 8,032,414 B2 | 10/2011 | Payne et al. | |
| 8,032,932 B2 | 10/2011 | Speyer et al. | |
| 8,060,413 B2 | 11/2011 | Castell et al. | |
| 8,104,674 B2 | 1/2012 | Smith et al. | |
| 8,171,531 B2 | 5/2012 | Buer | |
| 8,200,582 B1 | 6/2012 | Zhu | |
| 8,238,825 B2 | 8/2012 | Rofougaran et al. | |
| 8,245,915 B1 | 8/2012 | Ramachandran et al. | |
| 8,249,500 B2 | 8/2012 | Wilson | |
| 8,249,805 B2 | 8/2012 | de Silva et al. | |
| 8,272,562 B2 | 9/2012 | Ziegler | |
| 8,307,413 B2 | 11/2012 | Smadja et al. | |
| 8,311,895 B1 | 11/2012 | Murugan et al. | |
| 8,327,428 B2 | 12/2012 | Bailey et al. | |
| 8,327,428 B2 | 12/2012 | Speyer et al. | |
| 8,332,329 B1 | 12/2012 | Thiele | |
| 8,346,666 B2 | 1/2013 | Lindelsee et al. | |
| 8,380,177 B2 | 2/2013 | Laracey | |
| 8,395,242 B2 | 3/2013 | Oliver et al. | |
| 8,407,142 B1 | 3/2013 | Griggs | |
| 8,418,917 B1 | 4/2013 | Lewis et al. | |
| 8,422,462 B2 | 4/2013 | Kobayashi | |
| 8,423,466 B2 | 4/2013 | Lanc | |
| 8,459,560 B1 | 6/2013 | Mineo-Goggin | |
| 8,474,700 B1 | 7/2013 | Lewis et al. | |
| 8,494,958 B2 | 7/2013 | Schoenberg et al. | |
| 8,498,940 B2 | 7/2013 | Pelegero et al. | |
| 8,516,056 B2 | 8/2013 | Allen, Jr. et al. | |
| 8,522,039 B2 | 8/2013 | Hyndman et al. | |
| 8,538,591 B1 | 9/2013 | Klughart | |
| 8,540,142 B1 | 9/2013 | Lewis et al. | |
| 8,551,186 B1 | 10/2013 | Strand | |
| 8,572,689 B2 | 10/2013 | Radhakrishnan | |
| 8,577,804 B1 | 11/2013 | Bacastow | |
| 8,583,498 B2 | 11/2013 | Fried et al. | |
| 8,584,251 B2 | 11/2013 | McGuire et al. | |
| 8,589,266 B2 | 11/2013 | Liu et al. | |
| 8,589,271 B2 | 11/2013 | Evans | |
| 8,590,008 B1 | 11/2013 | Ellmore | |
| 8,595,812 B2 | 11/2013 | Bomar et al. | |
| 8,600,883 B2 | 12/2013 | Wong | |
| 8,612,351 B2 | 12/2013 | Liu et al. | |
| 8,620,790 B2 | 12/2013 | Priebatsch | |
| 8,631,089 B1 | 1/2014 | Pereira et al. | |
| 8,658,393 B2 | 2/2014 | Reik et al. | |
| 8,682,802 B1 | 3/2014 | Kannanari | |
| 8,683,571 B2 | 3/2014 | Zapata et al. | |
| 8,694,366 B2 | 4/2014 | Barnes, Jr. | |
| 8,714,445 B1 | 5/2014 | Katz et al. | |
| 8,768,838 B1 | 7/2014 | Hoffman | |
| 8,788,333 B2 | 7/2014 | Alba et al. | |
| 8,788,429 B2 | 7/2014 | Tieken | |
| 8,789,162 B2 | 7/2014 | Radhakrishnan | |
| 8,839,383 B2 | 9/2014 | Van Horn | |
| 8,850,575 B1 | 9/2014 | Magi Shaashua et al. | |
| 8,930,271 B1 | 1/2015 | Ellis et al. | |
| 8,943,574 B2 | 1/2015 | Bailey et al. | |
| 8,973,102 B2 | 3/2015 | Jakobsson | |
| 8,985,442 B1 | 3/2015 | Zhou et al. | |
| 8,996,423 B2 | 3/2015 | Johnson et al. | |
| 9,002,750 B1 | 4/2015 | Chu et al. | |
| 9,055,053 B2 | 6/2015 | Radhakrishnan et al. | |
| 9,069,943 B2 | 6/2015 | Radhakrishnan et al. | |
| 9,171,296 B1 * | 10/2015 | Kurian | G06Q 20/0425 |
| 9,195,984 B1 | 11/2015 | Spector et al. | |
| 9,412,106 B2 | 8/2016 | Laracey | |
| 9,640,001 B1 | 5/2017 | Vazquez et al. | |
| 2001/0029483 A1 | 10/2001 | Schultz et al. | |
| 2001/0029485 A1 | 10/2001 | Brody et al. | |
| 2001/0034720 A1 | 10/2001 | Armes | |
| 2001/0054111 A1 | 12/2001 | Lee et al. | |
| 2002/0032612 A1 | 3/2002 | Williams et al. | |
| 2002/0032662 A1 | 3/2002 | Maclin et al. | |

(56) References Cited

U.S. PATENT DOCUMENTS

| | | |
|---|---|---|
| 2002/0046341 A1 | 4/2002 | Kazaks et al. |
| 2002/0056756 A1 | 5/2002 | Cameron et al. |
| 2002/0072379 A1 | 6/2002 | Chen et al. |
| 2002/0096570 A1 | 7/2002 | Wong et al. |
| 2002/0111907 A1 | 8/2002 | Ling |
| 2002/0129255 A1 | 9/2002 | Tsuchiyama et al. |
| 2002/0152179 A1 | 10/2002 | Racov |
| 2002/0157029 A1 | 10/2002 | French et al. |
| 2002/0174073 A1 | 11/2002 | Nordman et al. |
| 2002/0186845 A1 | 12/2002 | Dutta et al. |
| 2003/0004866 A1 | 1/2003 | Huennekens et al. |
| 2003/0009355 A1 | 1/2003 | Gupta |
| 2003/0045328 A1 | 3/2003 | Natsuno |
| 2003/0055733 A1 | 3/2003 | Marshall et al. |
| 2003/0061170 A1* | 3/2003 | Uzo ............... G06Q 20/06 705/64 |
| 2003/0105714 A1 | 6/2003 | Alarcon-Luther et al. |
| 2003/0163787 A1 | 8/2003 | Hay et al. |
| 2003/0177090 A1 | 9/2003 | Eden |
| 2003/0225625 A1 | 12/2003 | Chew et al. |
| 2004/0030645 A1 | 2/2004 | Monaghan |
| 2004/0098308 A1 | 5/2004 | Okano |
| 2004/0153410 A1* | 8/2004 | Nootebos ............... G06Q 20/12 705/44 |
| 2004/0254868 A1 | 12/2004 | Kirkland et al. |
| 2005/0049977 A1 | 3/2005 | Suisa |
| 2005/0080730 A1 | 4/2005 | Sorrentino |
| 2005/0131820 A1 | 6/2005 | Rodriguez et al. |
| 2005/0131834 A1* | 6/2005 | Rodriguez ............ G06Q 20/04 705/64 |
| 2005/0154670 A1 | 7/2005 | Heitz et al. |
| 2005/0165651 A1 | 7/2005 | Mohan |
| 2005/0171849 A1 | 8/2005 | Brissette |
| 2005/0222961 A1 | 10/2005 | Staib et al. |
| 2005/0240498 A1 | 10/2005 | Thaler |
| 2005/0246234 A1 | 11/2005 | Munyon |
| 2005/0246275 A1 | 11/2005 | Nelson |
| 2005/0283621 A1 | 12/2005 | Sato et al. |
| 2006/0036868 A1 | 2/2006 | Cicchitto |
| 2006/0089893 A1 | 4/2006 | Joseph et al. |
| 2006/0095369 A1 | 5/2006 | Hofi |
| 2006/0161501 A1* | 7/2006 | Waserstein ........... G06Q 20/042 705/65 |
| 2006/0163345 A1 | 7/2006 | Myers et al. |
| 2006/0206709 A1 | 9/2006 | Labrou et al. |
| 2006/0218577 A1 | 9/2006 | Goodman et al. |
| 2006/0237531 A1 | 10/2006 | Heffez et al. |
| 2006/0259390 A1 | 11/2006 | Rosenberger |
| 2006/0287004 A1 | 12/2006 | Fuqua |
| 2007/0055594 A1 | 3/2007 | Rivest et al. |
| 2007/0073585 A1 | 3/2007 | Apple et al. |
| 2007/0073685 A1* | 3/2007 | Thibodeau ............ G06Q 10/10 |
| 2007/0083465 A1 | 4/2007 | Ciurea et al. |
| 2007/0100773 A1 | 5/2007 | Wallach |
| 2007/0106611 A1 | 5/2007 | Larsen |
| 2007/0118747 A1* | 5/2007 | Pintsov .................. G06Q 20/04 713/170 |
| 2007/0130315 A1 | 6/2007 | Friend et al. |
| 2007/0130463 A1* | 6/2007 | Law ........................ G06F 21/34 713/168 |
| 2007/0156517 A1 | 7/2007 | Kaplan et al. |
| 2007/0156842 A1 | 7/2007 | Vermeulen et al. |
| 2007/0162337 A1 | 7/2007 | Hawkins et al. |
| 2007/0174082 A1 | 7/2007 | Singh |
| 2007/0175977 A1 | 8/2007 | Bauer et al. |
| 2007/0192245 A1 | 8/2007 | Fisher et al. |
| 2007/0194884 A1 | 8/2007 | Didier et al. |
| 2007/0198921 A1 | 8/2007 | Collison et al. |
| 2007/0203835 A1 | 8/2007 | Cai |
| 2007/0219984 A1 | 9/2007 | Aravamudan et al. |
| 2007/0220597 A1 | 9/2007 | Ishida |
| 2007/0223706 A1 | 9/2007 | Gantman et al. |
| 2007/0239473 A1 | 10/2007 | Picolli |
| 2007/0250920 A1 | 10/2007 | Lindsay |
| 2007/0265984 A1 | 11/2007 | Santhana |
| 2007/0276764 A1 | 11/2007 | Mann, III et al. |
| 2007/0293192 A9 | 12/2007 | De Groot |
| 2008/0010193 A1 | 1/2008 | Rackley, III et al. |
| 2008/0021772 A1 | 1/2008 | Aloni et al. |
| 2008/0040274 A1* | 2/2008 | Uzo ...................... G06Q 20/40 705/44 |
| 2008/0040276 A1 | 2/2008 | Hammad et al. |
| 2008/0073422 A1 | 3/2008 | Zhou |
| 2008/0109319 A1 | 5/2008 | Foss |
| 2008/0141117 A1 | 6/2008 | King et al. |
| 2008/0162338 A1 | 7/2008 | Samuels et al. |
| 2008/0162589 A1 | 7/2008 | Rodeheffer et al. |
| 2008/0167965 A1 | 7/2008 | Von Nothaus et al. |
| 2008/0189169 A1 | 8/2008 | Turpin et al. |
| 2008/0189210 A1 | 8/2008 | Sawhney |
| 2008/0195499 A1 | 8/2008 | Meredith et al. |
| 2008/0195517 A1 | 8/2008 | Minerley |
| 2008/0195536 A1 | 8/2008 | Karns et al. |
| 2008/0197192 A1 | 8/2008 | Lindahl et al. |
| 2008/0217397 A1 | 9/2008 | Degliantoni et al. |
| 2008/0275748 A1 | 11/2008 | John |
| 2008/0281722 A1 | 11/2008 | Balasubramanian et al. |
| 2008/0288396 A1 | 11/2008 | Siggers et al. |
| 2008/0293397 A1 | 11/2008 | Gajdos et al. |
| 2008/0296368 A1 | 12/2008 | Newsom |
| 2008/0301057 A1 | 12/2008 | Oren |
| 2008/0307515 A1 | 12/2008 | Drokov et al. |
| 2008/0308628 A1 | 12/2008 | Payne et al. |
| 2008/0313087 A1 | 12/2008 | Joseph et al. |
| 2008/0319889 A1 | 12/2008 | Hammad |
| 2009/0006230 A1 | 1/2009 | Lyda et al. |
| 2009/0012898 A1 | 1/2009 | Sharma et al. |
| 2009/0019534 A1 | 1/2009 | Bakshi et al. |
| 2009/0048953 A1 | 2/2009 | Hazel et al. |
| 2009/0057396 A1 | 3/2009 | Barbour et al. |
| 2009/0063353 A1 | 3/2009 | Viidu et al. |
| 2009/0070219 A1 | 3/2009 | D'Angelo et al. |
| 2009/0100529 A1 | 4/2009 | Livnat et al. |
| 2009/0119190 A1 | 5/2009 | Realini |
| 2009/0121012 A1 | 5/2009 | Beemer et al. |
| 2009/0150286 A1 | 6/2009 | Barton |
| 2009/0164327 A1 | 6/2009 | Bishop et al. |
| 2009/0187508 A1 | 7/2009 | Placide |
| 2009/0192900 A1 | 7/2009 | Collison et al. |
| 2009/0201149 A1 | 8/2009 | Kaji |
| 2009/0222353 A1 | 9/2009 | Guest et al. |
| 2009/0254440 A1 | 10/2009 | Pharris |
| 2009/0261158 A1* | 10/2009 | Lawson ............... G07D 7/0047 235/379 |
| 2009/0271265 A1 | 10/2009 | Lay et al. |
| 2009/0281904 A1 | 11/2009 | Pharris |
| 2009/0289764 A1 | 11/2009 | Chiu |
| 2009/0307132 A1 | 12/2009 | Phillips |
| 2009/0313109 A1 | 12/2009 | Bous et al. |
| 2009/0319352 A1 | 12/2009 | Boyle et al. |
| 2009/0327308 A1 | 12/2009 | Carter et al. |
| 2009/0328186 A1 | 12/2009 | Pollutro et al. |
| 2010/0010918 A1 | 1/2010 | Hunt |
| 2010/0023449 A1 | 1/2010 | Skowronek et al. |
| 2010/0023455 A1 | 1/2010 | Dispensa et al. |
| 2010/0036741 A1 | 2/2010 | Cleven |
| 2010/0042517 A1 | 2/2010 | Paintin et al. |
| 2010/0051686 A1 | 3/2010 | Obi |
| 2010/0064345 A1 | 3/2010 | Bentley et al. |
| 2010/0070376 A1 | 3/2010 | Proud et al. |
| 2010/0076833 A1 | 3/2010 | Nelsen |
| 2010/0078762 A1 | 4/2010 | Wang |
| 2010/0082481 A1 | 4/2010 | Lin et al. |
| 2010/0091763 A1 | 4/2010 | Thompson |
| 2010/0121767 A1 | 5/2010 | Coulter et al. |
| 2010/0122333 A1 | 5/2010 | Noe |
| 2010/0125509 A1 | 5/2010 | Kranzley et al. |
| 2010/0133334 A1 | 6/2010 | Vadhri |
| 2010/0138344 A1 | 6/2010 | Wong et al. |
| 2010/0138347 A1 | 6/2010 | Chen |
| 2010/0145854 A1 | 6/2010 | Messerges et al. |
| 2010/0217670 A1 | 8/2010 | Reis et al. |
| 2010/0228614 A1 | 9/2010 | Zhang et al. |

(56) References Cited

U.S. PATENT DOCUMENTS

| | | |
|---|---|---|
| 2010/0235283 A1 | 9/2010 | Gerson |
| 2010/0235882 A1 | 9/2010 | Moore |
| 2010/0241571 A1 | 9/2010 | McDonald |
| 2010/0257099 A1 | 10/2010 | Bonalle et al. |
| 2010/0262830 A1 | 10/2010 | Kusakawa et al. |
| 2010/0268645 A1 | 10/2010 | Martino et al. |
| 2010/0274610 A1 | 10/2010 | Andersen et al. |
| 2010/0312636 A1 | 12/2010 | Coulter et al. |
| 2011/0015980 A1 | 1/2011 | Li |
| 2011/0022483 A1 | 1/2011 | Hammad |
| 2011/0040684 A1 | 2/2011 | Beck et al. |
| 2011/0047075 A1 | 2/2011 | Fourez |
| 2011/0055008 A1 | 3/2011 | Feuerstein et al. |
| 2011/0060653 A1 | 3/2011 | King et al. |
| 2011/0078004 A1 | 3/2011 | Swanson, Sr. |
| 2011/0099104 A1 | 4/2011 | Nybom |
| 2011/0103586 A1 | 5/2011 | Nobre |
| 2011/0106631 A1 | 5/2011 | Lieberman et al. |
| 2011/0108622 A1 | 5/2011 | Das et al. |
| 2011/0113064 A1 | 5/2011 | Govindachetty et al. |
| 2011/0119156 A1 | 5/2011 | Hwang et al. |
| 2011/0131089 A1 | 6/2011 | Walker et al. |
| 2011/0131128 A1 | 6/2011 | Vaananen |
| 2011/0137470 A1 | 6/2011 | Surnilla et al. |
| 2011/0137742 A1 | 6/2011 | Parikh |
| 2011/0137797 A1 | 6/2011 | Stals et al. |
| 2011/0137804 A1 | 6/2011 | Peterson |
| 2011/0143663 A1 | 6/2011 | Renard et al. |
| 2011/0153437 A1 | 6/2011 | Archer et al. |
| 2011/0153441 A1 | 6/2011 | Smith et al. |
| 2011/0161150 A1 | 6/2011 | Steffens et al. |
| 2011/0166922 A1 | 7/2011 | Fuerstenberg |
| 2011/0166931 A1 | 7/2011 | Joa et al. |
| 2011/0166992 A1 | 7/2011 | Dessert et al. |
| 2011/0168781 A1 | 7/2011 | Akesson |
| 2011/0173055 A1 | 7/2011 | Ross et al. |
| 2011/0178889 A1 | 7/2011 | Abraham et al. |
| 2011/0184790 A1 | 7/2011 | Brar et al. |
| 2011/0184855 A1 | 7/2011 | Webber et al. |
| 2011/0191149 A1 | 8/2011 | Blackhurst et al. |
| 2011/0191161 A1 | 8/2011 | Dai |
| 2011/0191173 A1 | 8/2011 | Blackhurst et al. |
| 2011/0196790 A1 | 8/2011 | Milne |
| 2011/0202462 A1 | 8/2011 | Keenan |
| 2011/0213665 A1 | 9/2011 | Joa et al. |
| 2011/0213700 A1 | 9/2011 | Sant'anselmo |
| 2011/0218884 A1 | 9/2011 | Kothari et al. |
| 2011/0218907 A1 | 9/2011 | Dessert et al. |
| 2011/0231268 A1 | 9/2011 | Ungos |
| 2011/0231305 A1 | 9/2011 | Winters |
| 2011/0246279 A1 | 10/2011 | Joa et al. |
| 2011/0246306 A1 | 10/2011 | Blackhurst et al. |
| 2011/0251892 A1 | 10/2011 | Laracey |
| 2011/0251965 A1 | 10/2011 | Holm et al. |
| 2011/0258031 A1 | 10/2011 | Valin et al. |
| 2011/0270749 A1 | 11/2011 | Bennett et al. |
| 2011/0276410 A1 | 11/2011 | Hjelm et al. |
| 2011/0277016 A1 | 11/2011 | Hockings et al. |
| 2011/0282729 A1 | 11/2011 | Gnanasambandam et al. |
| 2011/0282733 A1 | 11/2011 | Gnanasambandam et al. |
| 2011/0288998 A1 | 11/2011 | McGraw et al. |
| 2011/0302089 A1 | 12/2011 | McKenzie |
| 2012/0012651 A1 | 1/2012 | Kenna, III et al. |
| 2012/0016731 A1 | 1/2012 | Smith et al. |
| 2012/0018506 A1 | 1/2012 | Hammad et al. |
| 2012/0022944 A1 | 1/2012 | Volpi |
| 2012/0023022 A1 | 1/2012 | Carroll et al. |
| 2012/0023567 A1 | 1/2012 | Hammad |
| 2012/0028609 A1 | 2/2012 | Hruska |
| 2012/0030032 A1 | 2/2012 | Zurada |
| 2012/0030047 A1 | 2/2012 | Fuentes et al. |
| 2012/0030109 A1 | 2/2012 | Dooley Maley et al. |
| 2012/0030110 A1 | 2/2012 | Prakash et al. |
| 2012/0035997 A1 | 2/2012 | Burgess et al. |
| 2012/0036205 A1 | 2/2012 | Cole |
| 2012/0047022 A1 | 2/2012 | Shamim et al. |
| 2012/0054046 A1 | 3/2012 | Albisu |
| 2012/0054057 A1 | 3/2012 | O'Connell et al. |
| 2012/0055983 A1 | 3/2012 | Wellborn et al. |
| 2012/0066064 A1 | 3/2012 | Yoder et al. |
| 2012/0078751 A1 | 3/2012 | MacPhail et al. |
| 2012/0078762 A1 | 3/2012 | Valin et al. |
| 2012/0078782 A1 | 3/2012 | Schoenberg et al. |
| 2012/0080517 A1 | 4/2012 | Braunstein |
| 2012/0084162 A1 | 4/2012 | Smith et al. |
| 2012/0085829 A1 | 4/2012 | Ziegler |
| 2012/0089471 A1 | 4/2012 | Comparelli |
| 2012/0096499 A1 | 4/2012 | Dasher et al. |
| 2012/0111934 A1 | 5/2012 | Herzig |
| 2012/0116956 A1 | 5/2012 | Altman et al. |
| 2012/0123857 A1 | 5/2012 | Surve et al. |
| 2012/0130788 A1 | 5/2012 | Winslade et al. |
| 2012/0150728 A1 | 6/2012 | Isaacson et al. |
| 2012/0150747 A1 | 6/2012 | Carey |
| 2012/0158540 A1 | 6/2012 | Ganti et al. |
| 2012/0158584 A1 | 6/2012 | Von Behren et al. |
| 2012/0158586 A1 | 6/2012 | Ganti et al. |
| 2012/0160911 A1 | 6/2012 | Smith et al. |
| 2012/0160912 A1 | 6/2012 | Laracey |
| 2012/0166261 A1 | 6/2012 | Velusamy et al. |
| 2012/0166298 A1 | 6/2012 | Smith et al. |
| 2012/0166334 A1 | 6/2012 | Kimberg et al. |
| 2012/0171237 A1 | 7/2012 | Ching et al. |
| 2012/0173431 A1 | 7/2012 | Ritchie et al. |
| 2012/0179558 A1 | 7/2012 | Fischer |
| 2012/0185317 A1 | 7/2012 | Wong |
| 2012/0185354 A1 | 7/2012 | Crucs |
| 2012/0191522 A1 | 7/2012 | McLaughlin et al. |
| 2012/0191597 A1 | 7/2012 | Capel et al. |
| 2012/0191606 A1 | 7/2012 | Milne |
| 2012/0197743 A1 | 8/2012 | Grigg et al. |
| 2012/0197794 A1 | 8/2012 | Grigg et al. |
| 2012/0197797 A1 | 8/2012 | Grigg et al. |
| 2012/0200386 A1 | 8/2012 | Robshaw et al. |
| 2012/0203700 A1 | 8/2012 | Ornce et al. |
| 2012/0203707 A1 | 8/2012 | Hungerford et al. |
| 2012/0209630 A1 | 8/2012 | Ihm et al. |
| 2012/0209749 A1 | 8/2012 | Hammad et al. |
| 2012/0209773 A1 | 8/2012 | Ranganathan |
| 2012/0209775 A1 | 8/2012 | Milne |
| 2012/0209842 A1 | 8/2012 | Bettridge et al. |
| 2012/0214571 A1 | 8/2012 | Oakes et al. |
| 2012/0215610 A1 | 8/2012 | Amaro et al. |
| 2012/0221421 A1 | 8/2012 | Hammad |
| 2012/0222055 A1 | 8/2012 | Schaefer et al. |
| 2012/0230577 A1 | 9/2012 | Calman et al. |
| 2012/0232981 A1 | 9/2012 | Torossian et al. |
| 2012/0239417 A1 | 9/2012 | Pourfallah et al. |
| 2012/0252365 A1 | 10/2012 | Lam |
| 2012/0253852 A1 | 10/2012 | Pourfallah et al. |
| 2012/0253905 A1 | 10/2012 | Darragh |
| 2012/0253913 A1 | 10/2012 | Richard |
| 2012/0253917 A1 | 10/2012 | Cho et al. |
| 2012/0253958 A1 | 10/2012 | Sock et al. |
| 2012/0253974 A1 | 10/2012 | Haikonen et al. |
| 2012/0254941 A1 | 10/2012 | Levien et al. |
| 2012/0258660 A1 | 10/2012 | Rajendran et al. |
| 2012/0258776 A1 | 10/2012 | Lord et al. |
| 2012/0260318 A1 | 10/2012 | Fromentoux et al. |
| 2012/0265623 A1 | 10/2012 | Zhu et al. |
| 2012/0265679 A1 | 10/2012 | Calman et al. |
| 2012/0265688 A1 | 10/2012 | Dinan |
| 2012/0265689 A1 | 10/2012 | Routhenstein et al. |
| 2012/0265694 A1 | 10/2012 | Tuchman et al. |
| 2012/0265819 A1 | 10/2012 | McGann et al. |
| 2012/0267432 A1 | 10/2012 | Kuttuva |
| 2012/0271712 A1 | 10/2012 | Katzin et al. |
| 2012/0278201 A1 | 11/2012 | Milne |
| 2012/0278242 A1 | 11/2012 | Griffith |
| 2012/0284127 A1 | 11/2012 | Heiser, II et al. |
| 2012/0284130 A1 | 11/2012 | Lewis et al. |
| 2012/0290482 A1 | 11/2012 | Atef et al. |
| 2012/0303425 A1 | 11/2012 | Katzin et al. |
| 2012/0303528 A1 | 11/2012 | Weiner et al. |

(56) References Cited

U.S. PATENT DOCUMENTS

| | | |
|---|---|---|
| 2012/0316963 A1 | 12/2012 | Moshfeghi |
| 2012/0316992 A1 | 12/2012 | Oborne |
| 2012/0317034 A1 | 12/2012 | Guha et al. |
| 2012/0323783 A1 | 12/2012 | Canetto |
| 2012/0330846 A1 | 12/2012 | Light et al. |
| 2013/0006736 A1 | 1/2013 | Bethke et al. |
| 2013/0006756 A1 | 1/2013 | Heo |
| 2013/0006776 A1 | 1/2013 | Miller et al. |
| 2013/0013499 A1 | 1/2013 | Kalgi |
| 2013/0018706 A1 | 1/2013 | Bortolin et al. |
| 2013/0018738 A1 | 1/2013 | Faires et al. |
| 2013/0018791 A1 | 1/2013 | Mendicino et al. |
| 2013/0024360 A1 | 1/2013 | Ballout |
| 2013/0024379 A1 | 1/2013 | Di Tucci et al. |
| 2013/0031623 A1 | 1/2013 | Sanders |
| 2013/0032634 A1 | 2/2013 | McKirdy |
| 2013/0036000 A1 | 2/2013 | Giordano et al. |
| 2013/0036048 A1 | 2/2013 | Campos et al. |
| 2013/0036050 A1 | 2/2013 | Giordano et al. |
| 2013/0041811 A1 | 2/2013 | Vazquez et al. |
| 2013/0045760 A1 | 2/2013 | Obermeyer et al. |
| 2013/0046645 A1 | 2/2013 | Grigg et al. |
| 2013/0048714 A1 | 2/2013 | Sharma et al. |
| 2013/0048724 A1 | 2/2013 | Burnside et al. |
| 2013/0054336 A1 | 2/2013 | Graylin |
| 2013/0054470 A1 | 2/2013 | Campos et al. |
| 2013/0057897 A1 | 3/2013 | Park et al. |
| 2013/0060689 A1 | 3/2013 | Oskolkov et al. |
| 2013/0060708 A1 | 3/2013 | Oskolkov et al. |
| 2013/0073365 A1 | 3/2013 | McCarthy |
| 2013/0073546 A1 | 3/2013 | Yan et al. |
| 2013/0079037 A1 | 3/2013 | Dobyns |
| 2013/0085927 A1 | 4/2013 | Scott |
| 2013/0096996 A1 | 4/2013 | Tabor et al. |
| 2013/0097031 A1 | 4/2013 | Royyuru et al. |
| 2013/0097034 A1 | 4/2013 | Royyuru et al. |
| 2013/0097683 A1 | 4/2013 | Davis et al. |
| 2013/0109412 A1 | 5/2013 | Nguyen et al. |
| 2013/0110607 A1 | 5/2013 | Basmajian et al. |
| 2013/0110658 A1 | 5/2013 | Lyman et al. |
| 2013/0117170 A1 | 5/2013 | Coppinger |
| 2013/0124346 A1 | 5/2013 | Baldwin et al. |
| 2013/0124396 A1 | 5/2013 | Loff |
| 2013/0124855 A1 | 5/2013 | Varadarajan et al. |
| 2013/0143600 A1 | 6/2013 | Jan et al. |
| 2013/0150139 A1 | 6/2013 | Oakes |
| 2013/0159178 A1 | 6/2013 | Colon et al. |
| 2013/0159186 A1 | 6/2013 | Brudnicki et al. |
| 2013/0166332 A1 | 6/2013 | Hammad |
| 2013/0166384 A1 | 6/2013 | Das |
| 2013/0179254 A1 | 7/2013 | Joa et al. |
| 2013/0179341 A1 | 7/2013 | Boudreau |
| 2013/0179954 A1 | 7/2013 | Bidare |
| 2013/0191227 A1 | 7/2013 | Pasa et al. |
| 2013/0202185 A1 | 8/2013 | Irwin, Jr. et al. |
| 2013/0204775 A1 | 8/2013 | Midkiff et al. |
| 2013/0204787 A1 | 8/2013 | Dubois |
| 2013/0212007 A1 | 8/2013 | Mattsson et al. |
| 2013/0212019 A1 | 8/2013 | Mattsson et al. |
| 2013/0226799 A1 | 8/2013 | Raj |
| 2013/0238503 A1 | 9/2013 | Patel |
| 2013/0246147 A1 | 9/2013 | Chen et al. |
| 2013/0246171 A1 | 9/2013 | Carapelli |
| 2013/0246258 A1 | 9/2013 | Dessert |
| 2013/0246260 A1 | 9/2013 | Barten et al. |
| 2013/0254052 A1 | 9/2013 | Royyuru et al. |
| 2013/0254115 A1 | 9/2013 | Pasa et al. |
| 2013/0256403 A1 | 10/2013 | Keith |
| 2013/0262198 A1 | 10/2013 | Chung |
| 2013/0262315 A1 | 10/2013 | Hruska |
| 2013/0267224 A1 | 10/2013 | Krishnaswamy et al. |
| 2013/0268437 A1 | 10/2013 | Desai et al. |
| 2013/0282577 A1 | 10/2013 | Milne |
| 2013/0290101 A1 | 10/2013 | Arini et al. |
| 2013/0304637 A1 | 11/2013 | McCabe et al. |
| 2013/0304651 A1 | 11/2013 | Smith |
| 2013/0311365 A1 | 11/2013 | Miller et al. |
| 2013/0318627 A1 | 11/2013 | Lundkvist et al. |
| 2013/0324166 A1 | 12/2013 | Mian et al. |
| 2013/0339122 A1 | 12/2013 | Truitt et al. |
| 2013/0339165 A1* | 12/2013 | Calman ............... G06Q 30/06 705/16 |
| 2013/0346171 A1 | 12/2013 | Wright |
| 2013/0346302 A1 | 12/2013 | Purves et al. |
| 2014/0006273 A1 | 1/2014 | Gopinath et al. |
| 2014/0012647 A1 | 1/2014 | Hecht |
| 2014/0019352 A1 | 1/2014 | Shrivastava |
| 2014/0019358 A1* | 1/2014 | Priebatsch ........... G06Q 20/322 705/44 |
| 2014/0025581 A1 | 1/2014 | Calman |
| 2014/0025958 A1 | 1/2014 | Calman |
| 2014/0040001 A1 | 2/2014 | Harvey et al. |
| 2014/0048595 A1 | 2/2014 | Grigg et al. |
| 2014/0058946 A1 | 2/2014 | Paranjape |
| 2014/0067661 A1 | 3/2014 | Elischer |
| 2014/0067678 A1 | 3/2014 | Lee et al. |
| 2014/0095383 A1 | 4/2014 | Rao |
| 2014/0118719 A1 | 5/2014 | Frogget et al. |
| 2014/0122331 A1 | 5/2014 | Vaish et al. |
| 2014/0129357 A1 | 5/2014 | Goodwin |
| 2014/0130127 A1 | 5/2014 | Toole et al. |
| 2014/0136323 A1 | 5/2014 | Zhang et al. |
| 2014/0136405 A1 | 5/2014 | DuCharme et al. |
| 2014/0143089 A1 | 5/2014 | Campos et al. |
| 2014/0143145 A1* | 5/2014 | Kortina ............... G06Q 20/401 705/44 |
| 2014/0156535 A1 | 6/2014 | Jabbour et al. |
| 2014/0164243 A1 | 6/2014 | Aabye et al. |
| 2014/0172707 A1 | 6/2014 | Kuntagod et al. |
| 2014/0187147 A1 | 7/2014 | Rochberger et al. |
| 2014/0187148 A1 | 7/2014 | Taite et al. |
| 2014/0188719 A1 | 7/2014 | Poomachandran et al. |
| 2014/0208401 A1 | 7/2014 | Balakrishnan et al. |
| 2014/0214640 A1 | 7/2014 | Mallikarjunan et al. |
| 2014/0231527 A1 | 8/2014 | Anderson et al. |
| 2014/0244493 A1 | 8/2014 | Kenyon et al. |
| 2014/0244503 A1 | 8/2014 | Sadlier |
| 2014/0244510 A1 | 8/2014 | de Beasley |
| 2014/0245391 A1 | 8/2014 | Adenuga |
| 2014/0250009 A1 | 9/2014 | Carlson |
| 2014/0258157 A1 | 9/2014 | Pridmore et al. |
| 2014/0279476 A1 | 9/2014 | Hua |
| 2014/0279494 A1 | 9/2014 | Wiesman et al. |
| 2014/0279554 A1 | 9/2014 | Priebatsch et al. |
| 2014/0279566 A1 | 9/2014 | Verma et al. |
| 2014/0279688 A1 | 9/2014 | Ginsberg et al. |
| 2014/0310764 A1 | 10/2014 | Tippett et al. |
| 2014/0315159 A1 | 10/2014 | Mukherjee et al. |
| 2014/0324690 A1 | 10/2014 | Allen et al. |
| 2014/0330721 A1 | 11/2014 | Wang |
| 2014/0337175 A1 | 11/2014 | Katzin et al. |
| 2014/0344153 A1 | 11/2014 | Raj et al. |
| 2014/0351125 A1 | 11/2014 | Miller et al. |
| 2014/0359709 A1 | 12/2014 | Nassar et al. |
| 2014/0365334 A1 | 12/2014 | Hurewitz |
| 2015/0019317 A1 | 1/2015 | Mitchell |
| 2015/0019439 A1 | 1/2015 | Phillips |
| 2015/0032621 A1 | 1/2015 | Kar et al. |
| 2015/0032625 A1 | 1/2015 | Dill et al. |
| 2015/0032627 A1 | 1/2015 | Dill et al. |
| 2015/0039601 A1 | 2/2015 | Harrang et al. |
| 2015/0081557 A1 | 3/2015 | Kinfoil et al. |
| 2015/0081567 A1 | 3/2015 | Boyle et al. |
| 2015/0088740 A1 | 3/2015 | Doyle et al. |
| 2015/0100495 A1 | 4/2015 | Salama et al. |
| 2015/0100788 A1 | 4/2015 | Chastain et al. |
| 2015/0106275 A1 | 4/2015 | Wolfs et al. |
| 2015/0120569 A1 | 4/2015 | Belshe et al. |
| 2015/0120572 A1 | 4/2015 | Slade |
| 2015/0161610 A1 | 6/2015 | Sahadevan et al. |
| 2015/0170149 A1 | 6/2015 | Sharma et al. |
| 2015/0199679 A1 | 7/2015 | Palanisamy et al. |
| 2015/0206131 A1 | 7/2015 | Phillips et al. |
| 2015/0206137 A1 | 7/2015 | Mazarim Fernandes |

(56) References Cited

U.S. PATENT DOCUMENTS

| | | |
|---|---|---|
| 2015/0220914 A1 | 8/2015 | Purves et al. |
| 2015/0254648 A1 | 9/2015 | Clements et al. |
| 2015/0254650 A1 | 9/2015 | Bondesen et al. |
| 2015/0254653 A1 | 9/2015 | Bondesen et al. |
| 2015/0254664 A1 | 9/2015 | Bondesen et al. |
| 2015/0269542 A1 | 9/2015 | Katz et al. |
| 2015/0278814 A1* | 10/2015 | Jaffe ................. G06Q 20/3276 705/44 |
| 2016/0117660 A1 | 4/2016 | Prakash et al. |
| 2016/0210652 A9 | 7/2016 | Boyle et al. |
| 2016/0224977 A1* | 8/2016 | Sabba ................. G06Q 20/385 |

FOREIGN PATENT DOCUMENTS

| | | |
|---|---|---|
| JP | 2008225832 A | 9/2008 |
| WO | 9907121 A2 | 2/1999 |
| WO | 03007221 A2 | 1/2003 |
| WO | 2012058099 A1 | 5/2012 |
| WO | 2013095486 A1 | 6/2013 |

OTHER PUBLICATIONS

Lane, "History of APIs"; APIE; APIEvangelist.com; Dec. 2012, 11 pages.
'Digital Wallet' to pay for travel hasn't arrived yet, Orlando Sentinel [Orlando, Fla], Jan. 27, 2013; p. J.6.
Business Wire, "World's First and Only Global Mobile Wallet Sees Strong User Adoption with 150 Million Miles Loaded to Cash in First Month of Launch", Nov. 28, 2012, Zurich.

* cited by examiner ded PIN does not match
SYSTEM FOR DATA ROTATION THROUGH TOKENIZATION

BACKGROUND

Although credit and debit card payments are on the rise, the expenses and additional record keeping involved with card payments are not ideal for all businesses. Checks are considered a viable option to those businesses that wish to expand customer payment options beyond cash but aren't ready to make the leap to card payments. Typically, a check is a document that orders a payment of money from a financial institution account. However, with the increase in a number of alternative payment options, the number of customers that carry their checkbook with them has decreased considerably. There is a need for a system to integrate mobile technology to generate a check as a payment option.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The embodiments provided herein are directed to systems for A system for data rotation through tokenization, the system comprising a processor and a non-transitory computer-readable memory storing computer-executable instructions, that when executed by the processor, cause the system to determine one or more check data fields of a check such as check number and routing number; generate a PIN based on the determined check data fields; receive user input of a user PIN; compare the generated PIN with the inputted user PIN; if the generated PIN matches the inputted user PIN, proceed with the transaction; and if the generated PIN does not match the inputted user PIN, cancel the transaction.

In some embodiments, the system includes a point of sale terminal comprising a scanner for scanning the check to determine the one or more check data fields. In some embodiments, receiving user input of the user PIN comprises receiving, by a communication device of the system from a mobile device of the user, a text message, SMS message or phone call comprising the user input of a user PIN. In some embodiments, generating a PIN comprises applying a unique hash to the check number and/or the routing number, resulting in a hashed result. In some such embodiments, generating a PIN further comprises comparing the hashed result to a table of hashed results to determine the generated PIN.

In some embodiments, the computer-executable instructions comprise further instructions, that when executed by the processor, cause the system to receive a PIN change request from the user; update a table of PINs with a new PIN based on the PIN change request; and transmit a successful PIN change message to the user.

In some embodiments, the computer-executable instructions comprise further instructions, that when executed by the processor, cause the system to receive user input requesting one or more second user PINs; and update a PIN table to associate the one or more second user PINs with one or more checks, wherein the one or more checks were previously associated with at least one first PIN.

In some embodiments, the system includes a mobile device of the user comprising a digital wallet module stored in a memory, comprising executable instructions that when executed by a processor cause the processor to receive a request, from the user, to perform a transaction with a merchant; generate a virtual check comprising a checking account number, a bank routing number, and a date; and initiate display of the virtual check on a display of the mobile device. In some such embodiments, the digital wallet module stored in a memory, further comprises executable instructions that when executed by a processor cause the processor to receive input from the user corresponding to at least one of a plurality of check fields; and populate the virtual check based on the received input.

According to embodiments of the invention, a computer program product for data rotation through tokenization includes a non-transitory computer-readable medium including code causing a system to determine one or more check data fields of a check such as check number and routing number; generate a PIN based on the determined check data fields; receive user input of a user PIN; compare the generated PIN with the inputted user PIN; if the generated PIN matches the inputted user PIN, proceed with the transaction; and if the generated PIN does not match the inputted user PIN, cancel the transaction.

In some embodiments, a point of sale terminal comprises a scanner for scanning the check to for determining the one or more check data fields. In some embodiments, receiving user input of the user PIN comprises receiving, by a communication device of the system from a mobile device of the user, a text message, SMS message or phone call comprising the user input of a user PIN.

In some embodiments, generating a PIN comprises applying a unique hash to the check number and/or the routing number, resulting in a hashed result. In some such embodiments, generating a PIN further comprises comparing the hashed result to a table of hashed results to determine the generated PIN.

In some embodiments, the computer-executable instructions comprise further code, that when executed by the processor, are configured to cause the system to receive a PIN change request from the user; update a table of PINs with a new PIN based on the PIN change request; and transmit a successful PIN change message to the user.

In some embodiments, the computer-executable instructions comprise further code, that when executed by the processor, cause the system to receive user input requesting one or more second user PINs; and update a PIN table to associate the one or more second user PINs with one or more checks, wherein the one or more checks were previously associated with at least one first PIN.

According to embodiments of the invention, a computer-implemented method for data rotation through tokenization includes determining one or more check data fields of a check such as check number and routing number; generating a PIN based on the determined check data fields; receiving user input of a user PIN; comparing the generated PIN with the inputted user PIN; if the generated PIN matches the inputted user PIN, proceeding with the transaction; and if the generated PIN does not match the inputted user PIN, cancelling the transaction.

In some embodiments, a point of sale terminal comprises a scanner for scanning the check to determine the one or more check data fields.

In some embodiments, receiving user input of the user PIN comprises receiving, by a communication device of the system from a mobile device of the user, a text message, SMS message or phone call comprising the user input of a user PIN.

In some embodiments, generating a PIN comprises applying a unique hash to the check number and/or the routing number, resulting in a hashed result.

BRIEF DESCRIPTION OF THE SEVERAL VIEWS OF THE DRAWINGS

The present embodiments are further described in the detailed description which follows in reference to the noted plurality of drawings by way of non-limiting examples of the present embodiments in which like reference numerals represent similar parts throughout the several views of the drawings and wherein.

DETAILED DESCRIPTION

Figure 1:
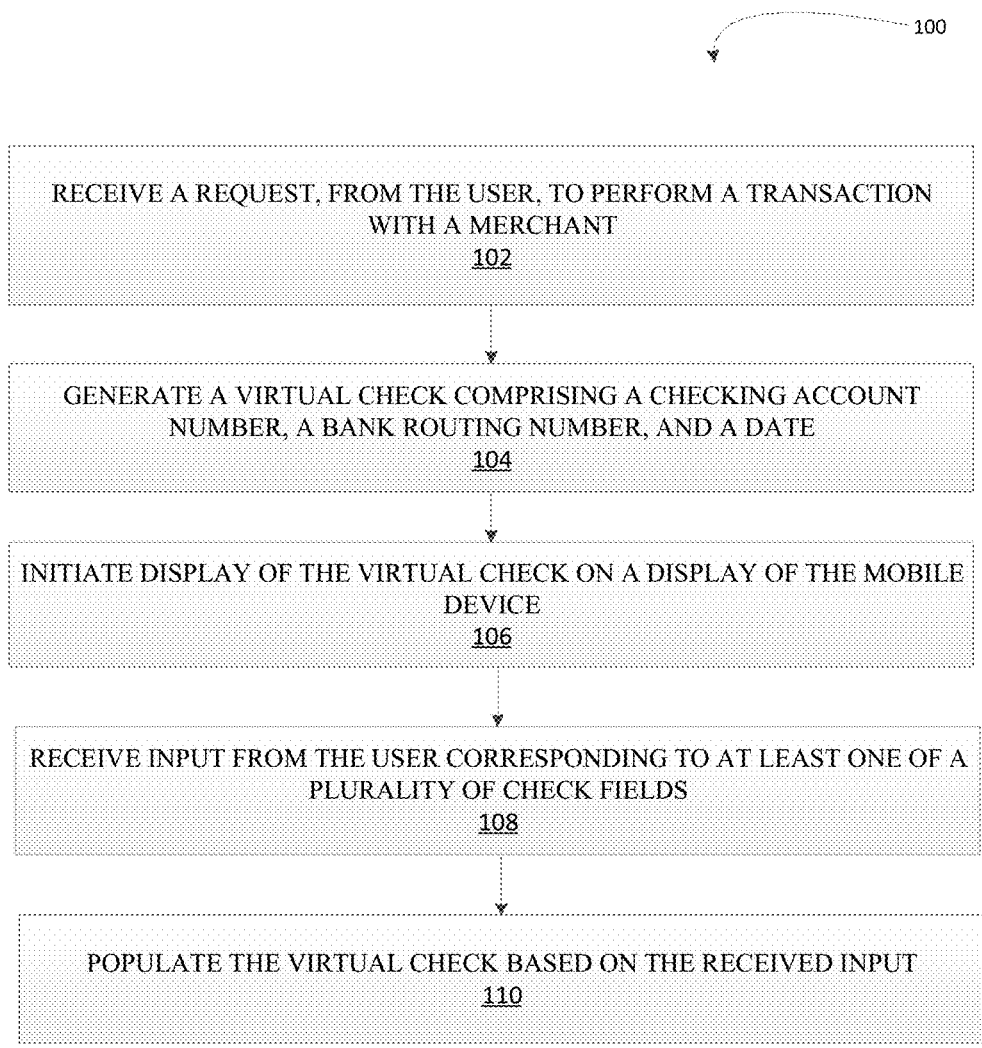
FIG. 1 is a flowchart illustrating a system and method for generating a check on a mobile device.

The embodiments presented herein are directed to systems, methods, and computer program products for generating a check on a mobile device. Although credit and debit card payments are on the rise, the expenses and additional record keeping involved with card payments are not ideal for all businesses. Checks are considered a viable option to those businesses that wish to expand customer payment options beyond cash but aren't ready to make the leap to card payments. Typically, a check is a document that orders a payment of money from a financial institution account. However, with the increase in a number of alternative payment options, the number of customers that carry their checkbook with them has decreased considerably. Embodiments of the present inventions disclose systems, methods, and computer program product for generating a check on a mobile device.

In accordance with embodiments of the invention, the term "financial transaction" or "transaction" refers to any transaction involving directly or indirectly the movement of monetary funds through traditional paper transaction processing systems (i.e. paper check processing) or through electronic transaction processing systems. Typical financial transactions include point of sale (POS) transactions, automated teller machine (ATM) transactions, internet transactions, electronic funds transfers (EFT) between accounts, transactions with a financial institution teller, personal checks, etc. When discussing that transactions are evaluated it could mean that the transaction has already occurred, is in the processing of occurring or being processed, or it has yet to be processed by one or more financial institutions. In some embodiments of the invention the transaction may be a customer account event, such as but not limited to a customer changing a password, ordering new checks, adding new accounts, opening new accounts, etc.

In accordance with embodiments of the invention, the term "financial institution" refers to any organization in the business of moving, investing, or lending money, dealing in financial instruments, or providing financial services. This includes commercial banks, thrifts, federal and state savings banks, savings and loan associations, credit unions, investment companies, merchants, insurance companies and the like.

In accordance with embodiments of the invention the terms "customer" and "user" and "consumer" may be interchangeable. These terms may relate to a direct customer of the financial institution or person or entity that has authorization to act on behalf of the direct customer, user, or consumer (i.e., indirect customer). In one aspect, the system may be a software application designed to run on a mobile device (e.g., a smartphone, cellular phone, personal digital assistant (PDA)) associated with the user in association with the stored digital mobile wallet. In another aspect, the system may include an interpretation algorithm designed to run on the point-of-sale device associated with the merchant designed to execute transactions using the generated bank card number.

FIG. 1 illustrates a process flow for generating a check on a mobile device 100. As shown in block 102, the process flow includes receiving a request from a user to perform a transaction with a merchant. In response, the process flow includes generating a virtual check comprising a checking account number, a banking account number, and a date, as shown in block 104. In response to generating a virtual check, the process flow includes initiating display of the virtual check on a display of the mobile device, as shown in block 106. The system may then be configured to receive input from the user corresponding to at least one of a plurality of check fields, as shown in block 108. Once the system receives the input from the user, the process flow includes populate the virtual check based on the received input, as shown in block 110.

In some embodiments, the one or more check fields may be pre-filled. In this regard, the system may be configured to initiate the display of the virtual check on the display of the mobile device with one or more pre-filled check fields and receive user input corresponding to the one or more check fields that haven't been pre-filled. For example, the system may be configured to enable the user to set up a recurring check payment such as rent with one or more specific recipients such as a landlord. In such situations, the system may be configured to pre-fill one or more check fields such as payee (e.g., landlord) and transaction amount (e.g., rent amount). The user may then provide input in the signature line to complete the virtual check.

In one aspect, the one or more check fields include at least one of a personalization field including a name field and an address field, date field, a check number, a memo field, and a signature field. In another aspect, the virtual check may include bank identification numbers such as a checking account number, a routing number, a user number, and a check number. This information may be used by a bank to identify the transaction and resolve payment issues.

In some embodiments, the system may be configured to enable the user to receive the virtual check and utilize the virtual check to execute a financial transaction. In this regard, the user may present the virtual check to a merchant at a point-of-sale terminal of the merchant to complete the transaction. In some embodiments, the point-of-sale terminal of the merchant may include one or more applications capable of working synchronously with the virtual check generated on the mobile device. In some other embodiments, the virtual check may be transmitted wirelessly to the point-of-sale terminal of the merchant. In this regard, the system may be configured to enable the merchant to receive the virtual check as a valid payment vehicle and process the received virtual check to complete the transaction. For example, the virtual check may be transmitted using Near Field Communication (NFC), such as by the user "bumping"/"tapping" the send and/or receive the virtual check and/or other information.

In some embodiments, system may be configured to receive a virtual check from another user and present the virtual check to the financial institution. In one aspect, the system may be configured to enable the user to deposit the received virtual check using the mobile device of the user. In another aspect, the system may be configured to enable the user to present the received virtual check to an ATM to deposit the virtual check. In some embodiments, depositing the check may enable the system to receive verification from the source of the virtual check. In this regard, the user associated with generating the virtual check may be contacted to verify the information (e.g., one or more check fields) associated with the check prior to authorizing the check deposit.

In some embodiment, the system may be configured to receive the input from the user corresponding to at least one of a plurality of check fields to generate a virtual check. In response, the system may determine whether the financial institution account associated with the user has sufficient funds prior to generating the virtual check. In this way, the system may reduce the chances of a bounced check. Typically, a check is considered bounced when the check deposited by the payee cannot be processed because the financial institution account associated with the writer of the check has unavailable funds. Typically, the virtual check generated may have the current date in the date field to avoid any discrepancies in the transaction process. In one aspect, the system may be configured to generate a post-dated virtual check for valued and good-standing users for up to a predetermined threshold amount. In another aspect, the system may be configured to generate a post-dated virtual check for users based on the user's credit score.

Figure 2:
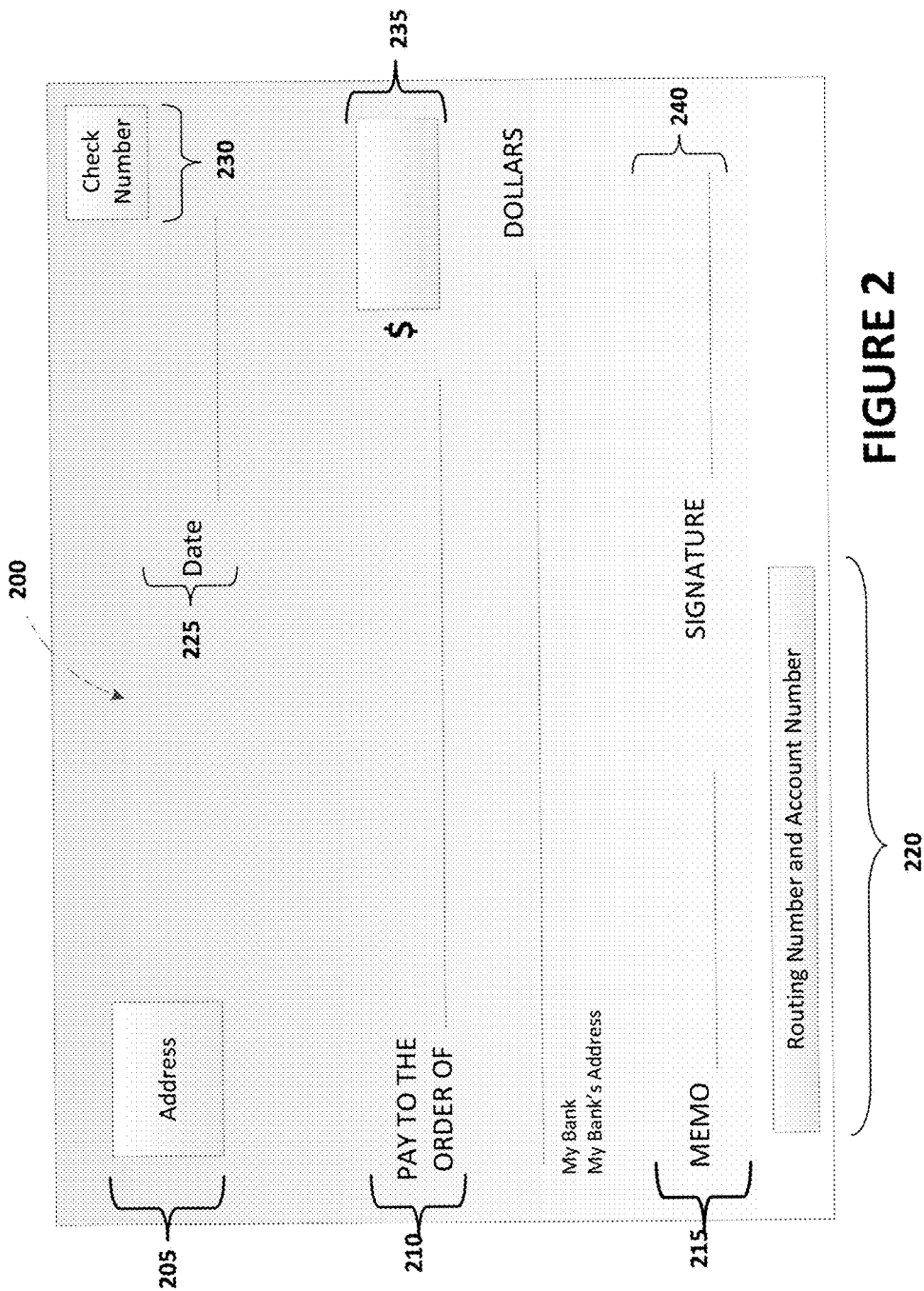
FIG. 2 illustrates an exemplary embodiment of a check template in accordance with various embodiments.

Referring now to FIG. 2, a check template 200 illustrated. In the illustrated embodiment, the check template 200 corresponds to the entire front portion of a check, but it will be understood that the check template 200 may also correspond to individual pieces of check information, portions of a check, or the like. The check template, in some embodiments, includes the format of certain types of checks associated with a bank, a merchant, an account holder, types of checks, style of checks, check manufacturer, and so forth. By using the check template, the system of process 100 any other system can "learn" to retrieve the key attributes of the check for faster and more accurate processing. In some embodiments, financial records are categorized by template. The check template 200 is only an exemplary template for a financial record, and other check templates or other financial record templates may be utilized to categorize checks or other financial records. The check template 200 can be used in the OCR processes, image overlay techniques, and the like.

The check template 200 comprises check information, wherein the check information includes, for example, a contact information field 205, a payee line field 210, a memo description field 215, an account number and routing number field 220 associated with the appropriate user or customer account, a date line field 225, a check number field 230, an amount box field 235, a signature line field 240, or the like.

Figure 3:
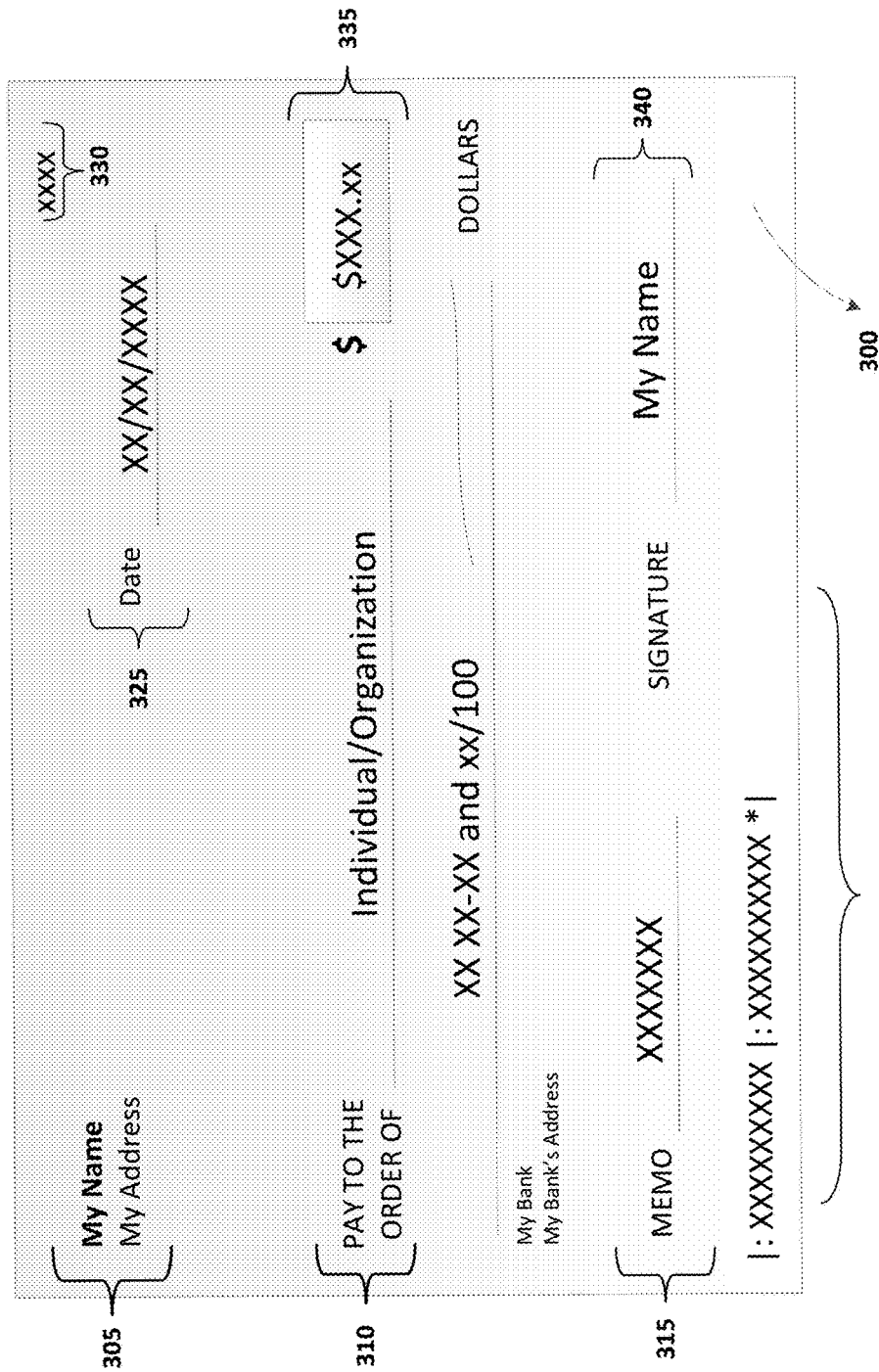
FIG. 3 illustrates an exemplary embodiment of an image of the generate virtual check.

Referring now to FIG. 3, an exemplary image of the generated virtual check 300 is illustrated. The image of virtual check 300 may comprise an image of the entire virtual check, a thumbnail version of the image of the virtual check, individual pieces of virtual check information, all or some portion of the front of the virtual check, all or some portion of the back of the virtual check, or the like. Virtual check 300 comprises check information, wherein the check information comprises contact information 205, the payee 210, the memo description 215, the account number and routing number 220 associated with the appropriate user or customer account, the date 225, the check number 230, the amount of the check 235, the signature 240, or the like. In some embodiments, the check information may comprise text. In other embodiments, the check information may comprise an image. The user may utilize the generated virtual check to conduct the financial transaction.

In some embodiments, the system may collect the check information from the image of the generated virtual check 300 and store the check information in a database as metadata (e.g., the database 438 of FIG. 4) for future use. In some embodiments, the pieces of check information may be stored in the database individually. In other embodiments, multiple pieces of check information may be stored in the database together.

Mobile Check Generator

Figure 4:
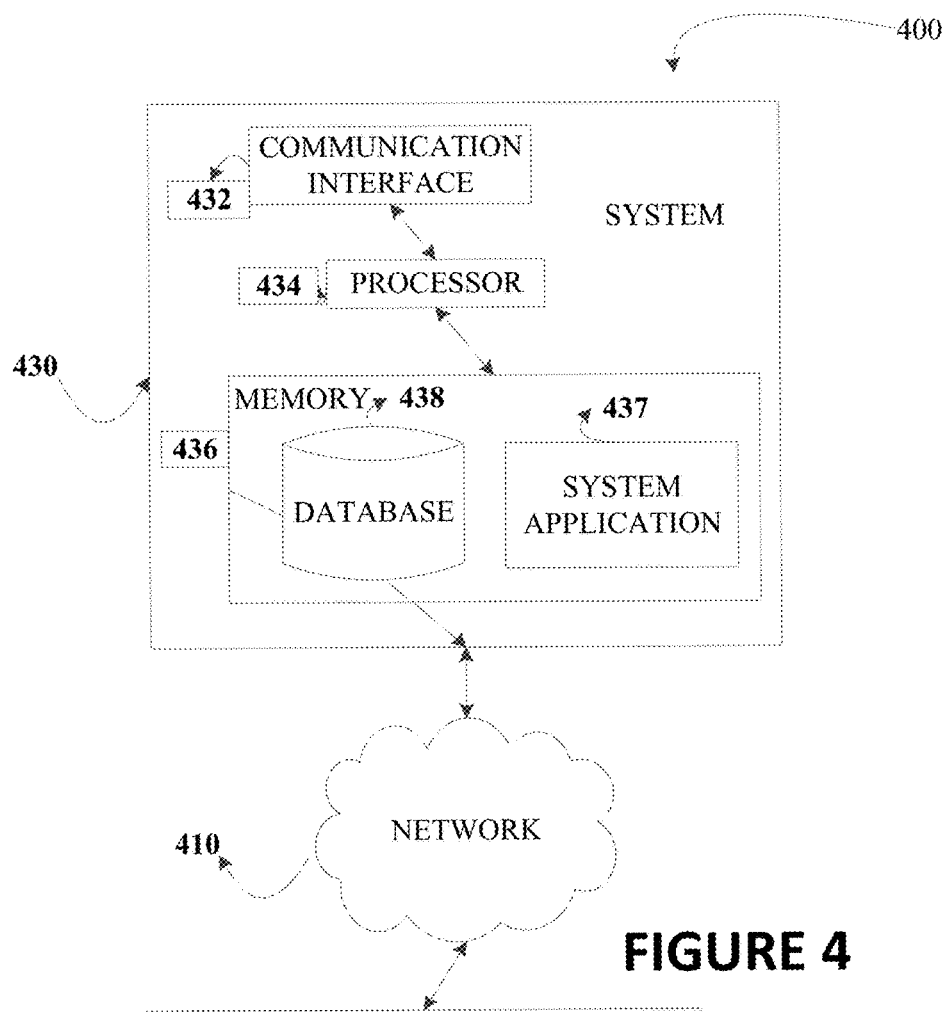
FIG. 4 illustrates an exemplary system for generating a check on a mobile device.

FIG. 4 presents an exemplary block diagram of the system environment 400 for implementing the process flows described herein in accordance with embodiments of the present invention. As illustrated, the system environment 400 includes a network 410, a system 430, and a user input system 440. Also shown in FIG. 4 is a user of the user input system 440. The user input system 440 may be a mobile device or other non-mobile computing device. The user may be a person who uses the user input system 440 to execute a user application 447. The user application 447 may be an application to communicate with the system 430, perform a transaction, input information onto a user interface presented on the user input system 440, or the like. The user application 447 and/or the system application 437 may incorporate one or more parts of any process flow described herein.

As shown in FIG. 4, the system 430, and the user input system 440 are each operatively and selectively connected to the network 410, which may include one or more separate networks. In addition, the network 410 may include a telecommunication network, local area network (LAN), a wide area network (WAN), and/or a global area network (GAN), such as the Internet. It will also be understood that the network 410 may be secure and/or unsecure and may also include wireless and/or wired and/or optical interconnection technology.

The user input system 440 may include any computerized apparatus that can be configured to perform any one or more of the functions of the user input system 440 described and/or contemplated herein. For example, the user may use the user input system 440 to transmit and/or receive information or commands to and from the system 430. In some embodiments, for example, the user input system 440 may include a personal computer system (e.g. a non-mobile or non-portable computing system, or the like), a mobile computing device, a personal digital assistant, a mobile phone, a tablet computing device, a network device, and/or the like. As illustrated in FIG. 4, in accordance with some embodiments of the present invention, the user input system 440 includes a communication interface 442, a processor 444, a memory 444 having an user application 447 stored therein, and a user interface 449. In such embodiments, the communication interface 442 is operatively and selectively connected to the processor 444, which is operatively and selectively connected to the user interface 449 and the memory 444. In some embodiments, the user may use the user application 447 to execute processes described with respect to the process flows described herein. Specifically, the user application 447 executes the process flows described herein.

Each communication interface described herein, including the communication interface 442, generally includes hardware, and, in some instances, software, that enables the user input system 440, to transport, send, receive, and/or otherwise communicate information to and/or from the communication interface of one or more other systems on the network 410. For example, the communication interface 442 of the user input system 440 may include a wireless transceiver, modem, server, electrical connection, and/or other electronic device that operatively connects the user input system 440 to another system such as the system 430. The wireless transceiver may include a radio circuit to enable wireless transmission and reception of information. Additionally, the user input system 440 may include a positioning system. The positioning system (e.g. a global positioning system (GPS), a network address (IP address) positioning system, a positioning system based on the nearest cell tower location, or the like) may enable at least the user input system 440 or an external server or computing device in communication with the user input system 440 to determine the location (e.g. location coordinates) of the user input system 440.

Each processor described herein, including the processor 444, generally includes circuitry for implementing the audio, visual, and/or logic functions of the user input system 440. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 447 of the memory 444 of the user input system 440.

Each memory device described herein, including the memory 444 for storing the user application 447 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

As shown in FIG. 4, the memory 444 includes the user application 447. In some embodiments, the user application 447 includes an interface for communicating with, navigating, controlling, configuring, and/or using the user input system 440. In some embodiments, the user application 447 includes computer-executable program code portions for instructing the processor 444 to perform one or more of the functions of the user application 447 described and/or contemplated herein. In some embodiments, the user application 447 may include and/or use one or more network and/or system communication protocols.

Also shown in FIG. 4 is the user interface 449. In some embodiments, the user interface 449 includes one or more output devices, such as a display and/or speaker, for presenting information to the user. In some embodiments, the user interface 449 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user. In some embodiments, the user interface 449 includes the input and display devices of a mobile device, which are operable to receive and display information.

FIG. 4 also illustrates a system 430, in accordance with an embodiment of the present invention. The system 430 may refer to the "apparatus" described herein. The system 430 may include any computerized apparatus that can be configured to perform any one or more of the functions of the system 430 described and/or contemplated herein. In accordance with some embodiments, for example, the system 430 may include a computer network, an engine, a platform, a server, a database system, a front end system, a back end system, a personal computer system, and/or the like. Therefore, the system 430 may be a server managed by the entity. The system 430 may be located at the facility associated with the entity or remotely from the facility associated with the entity. In some embodiments, such as the one illustrated in FIG. 4, the system 430 includes a communication interface 432, a processor 434, and a memory 434, which includes a system application 437 and a structured database 438 stored therein. As shown, the communication interface 432 is operatively and selectively connected to the processor 434, which is operatively and selectively connected to the memory 434.

It will be understood that the system application 437 may be configured to implement any one or more portions of the various user interfaces and/or process flow described herein. The system application 437 may interact with the user application 447. It will also be understood that, in some embodiments, the memory includes other applications. It will also be understood that, in some embodiments, the system application 437 is configured to communicate with the structured database 438, the user input system 440, or the like.

It will be further understood that, in some embodiments, the system application 437 includes computer-executable program code portions for instructing the processor 434 to perform any one or more of the functions of the system application 437 described and/or contemplated herein. In some embodiments, the system application 437 may include and/or use one or more network and/or system communication protocols.

In addition to the system application 437, the memory 434 also includes the structured database 438. As used herein, the structured database 438 may be one or more distinct and/or remote databases. In some embodiments, the structured database 438 is not located within the system and is instead located remotely from the system. In some embodiments, the structured database 438 stores information or data described herein.

It will be understood that the structured database 438 may include any one or more storage devices, including, but not limited to, datastores, databases, and/or any of the other storage devices typically associated with a computer system. It will also be understood that the structured database 438 may store information in any known way, such as, for example, by using one or more computer codes and/or languages, alphanumeric character strings, data sets, figures, tables, charts, links, documents, and/or the like. Further, in some embodiments, the structured database 438 may include information associated with one or more applications, such as, for example, the system application 437. It will also be understood that, in some embodiments, the structured database 438 provides a substantially real-time representation of the information stored therein, so that, for example, when the processor 434 accesses the structured database 438, the information stored therein is current or substantially current.

It will be understood that the embodiment of the system environment illustrated in FIG. 4 is exemplary and that other embodiments may vary. As another example, in some embodiments, the system 430 includes more, less, or different components. As another example, in some embodiments, some or all of the portions of the system environment 400 may be combined into a single portion. Likewise, in some embodiments, some or all of the portions of the system 430 may be separated into two or more distinct portions.

In addition, the various portions of the system environment 400 may be maintained for and/or by the same or separate parties. It will also be understood that the system 430 may include and/or implement any embodiment of the present invention described and/or contemplated herein. For example, in some embodiments, the system 430 is configured to implement any one or more of the embodiments of the process flows described and/or contemplated herein in connection any process flow described herein. Additionally, the system 430 or the user input system 440 is configured to initiate presentation of any of the user interfaces described herein.

In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

In accordance with embodiments of the invention, the term "financial transaction" or "transaction" refers to any transaction involving directly or indirectly the movement of monetary funds through traditional paper transaction processing systems (i.e. paper check processing) or through electronic transaction processing systems. Typical financial transactions include point of sale (POS) transactions, automated teller machine (ATM) transactions, internet transactions, electronic funds transfers (EFT) between accounts, transactions with a financial institution teller, personal checks, etc. When discussing that transactions are evaluated it could mean that the transaction has already occurred, is in the processing of occurring or being processed, or it has yet to be processed by one or more financial institutions. In some embodiments of the invention the transaction may be a customer account event, such as but not limited to the customer changing a password, ordering new checks, adding new accounts, opening new accounts, etc.

Tokenization

In accordance with embodiments of the invention, the term "financial institution" refers to any organization in the business of moving, investing, or lending money, dealing in financial instruments, or providing financial services. This includes commercial banks, thrifts, federal and state savings banks, savings and loan associations, credit unions, investment companies, merchants, insurance companies and the like.

In accordance with embodiments of the invention the terms "customer" and "user" and "consumer" may be interchangeable. These terms may relate to a direct customer of the financial institution or person or entity that has authorization to act on behalf of the direct customer, user, or consumer (i.e., indirect customer).

Various embodiments of the present invention relate to tokenization, which is generally described in the area of financial transactions as utilizing a "token" (e.g., an alias, substitute, surrogate, or other like identifier) as a replacement for sensitive account information, and in particular account numbers. As such, tokens or portions of tokens may be used as a stand in for a user account number, user name, pin number, routing information related to the financial institution associated with the account, security code, or other like information relating to the user account. The one or more tokens may then be utilized as a payment instrument to complete a transaction. The one or more tokens may be associated with one or more payment devices directly or within one or more digital wallets associated with the payment devices. In other embodiments, the tokens may be associated with electronic transactions that are made over the Internet instead of using a physical payment device. Utilizing a token as a payment instrument instead of actual account information, and specifically an account number, improves security, and provides flexibility and convenience in controlling the transactions, controlling accounts used for the transactions, and sharing transactions between various users.

Tokens may be single-use instruments or multi-use instruments depending on the types of controls (e.g., limits) initiated for the token, and the transactions in which the token is used as a payment instrument. Single-use tokens may be utilized once, and thereafter disappear, are replaced, or are erased, while multi-use tokens may be utilized more than once before they disappear, are replaced, or are erased.

Tokens may be 16-digit numbers (e.g., like credit, debit, or other like account numbers), may be numbers that are less than 16-digits, or may contain a combination of numbers, symbols, letters, or the like, and be more than, less than, or equal to 16-characters. In some embodiments, the tokens may have to be 16-characters or less in order to be compatible with the standard processing systems between merchants, acquiring financial institutions (e.g., merchant financial institution), card association networks (e.g., card processing companies), issuing financial institutions (e.g., user financial institution), or the like, which are used to request authorization, and approve or deny transactions entered into between a merchant (e.g., a specific business or individual user) and a user. In other embodiments of the invention, the tokens may be other types of electronic information (e.g., pictures, codes, or the like) that could be used to enter into a transaction instead of, or in addition to, using a string of characters (e.g., numbered character strings, alphanumeric character strings, symbolic character strings, combinations thereof, or the like). In a case where a PIN is tokenized, the tokenized PIN may be four (4) digits, six (6) digits or otherwise.

A user may have one or more digital wallets on the user's payment device. The digital wallets may be associated specifically with the user's financial institution, or in other embodiments may be associated with a specific merchant, group of merchants, or other third parties. The user may associate one or more user accounts (e.g., from the same institution or from multiple institutions) with the one or more digital wallets. In some embodiments, instead of the digital wallet storing the specific account number associated with the user account, the digital wallet may store a token or allow access to a token (e.g., provide a link or information that directs a system to a location of a token), in order to represent the specific account number during a transaction. In other embodiments of the invention, the digital wallet may store some or all of the user account information (e.g., account number, user name, pin number, or the like), including the user account number, but presents the one or more tokens instead of the user account information when entering into a transaction with a merchant. The merchant may be a business, a person that is selling a good or service (hereinafter "product"), or any other institution or individual with which the user is entering into a transaction.

The digital wallet may be utilized in a number of different ways. For example, the digital wallet may be a device digital wallet, a cloud digital wallet, an e-commerce digital wallet, or another type of digital wallet. In the case of a device digital wallet the tokens are actually stored on the payment device. When the device digital wallet is used in a transaction the token stored on the device is used to enter into the transaction with the merchant. With respect to a cloud digital wallet the device does not store the token, but instead the token is stored in the cloud of the provider of the digital wallet (or another third party). When the user enters into a transaction with a merchant, transaction information is collected and provided to the owner of the cloud to determine the token, and thus, how the transaction should be processed. In the case of an e-commerce digital wallet, a transaction is entered into over the Internet and not through a point of sale terminal. As was the case with the cloud digital wallet, when entering into a transaction with the merchant over the Internet the transaction information may be captured and transferred to the wallet provider (e.g., in some embodiments this may be the merchant or another third party that stores the token), and the transaction may be processed accordingly.

Specific tokens, in some embodiments, may be tied to a single user account, but in other embodiments, may be tied to multiple user accounts, as will be described throughout this application. In some embodiments a single tokens could represent multiple accounts, such that when entering into a transaction the user may select the token (or digital wallet associated with the token) and select one of the one or more accounts associated with the token in order to allocate the transaction to a specific account. In still other embodiments, after selection of the token by the user the system may determine the best account associated with the token to use during the transaction (e.g., most cash back, most rewards points, best discount, or the like). In addition, the tokens may be associated with a specific digital wallet or multiple digital wallets as desired by the institutions or users.

Moreover, the tokens themselves, or the user accounts, individual users, digital wallets, or the like associated with the tokens, may have limitations that limit the transactions that the users may enter into using the tokens. The limitations may include, limiting the transactions of the user to a single merchant, a group of multiple merchants, merchant categories, single products, a group a products, product categories, transaction amounts, transaction numbers, geographic locations, or other like limits as is described herein.

Figure 5:
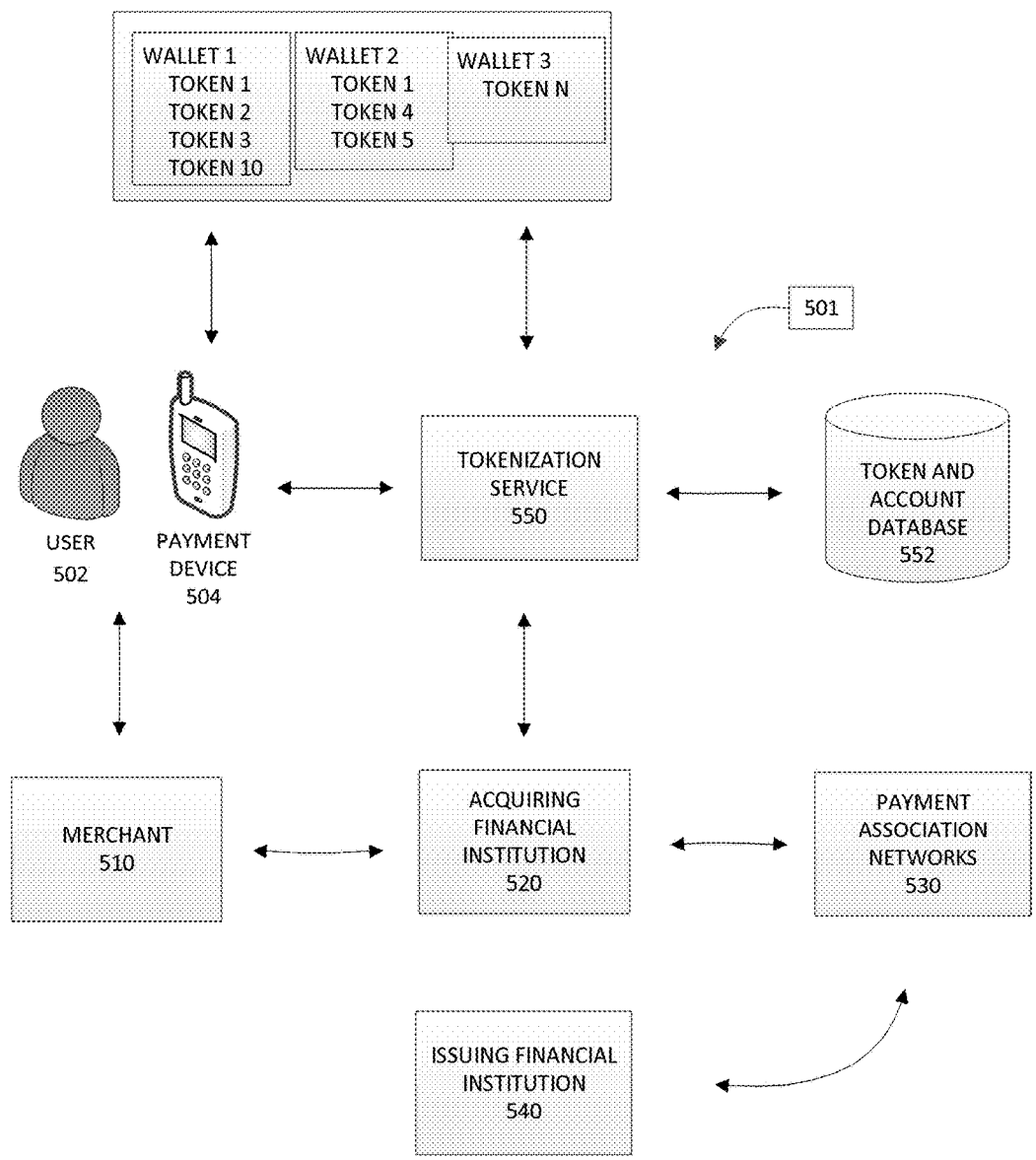
FIGS. 5-7 illustrate a number of different ways a user may use one or more tokens to enter into a transaction.
Figure 6:
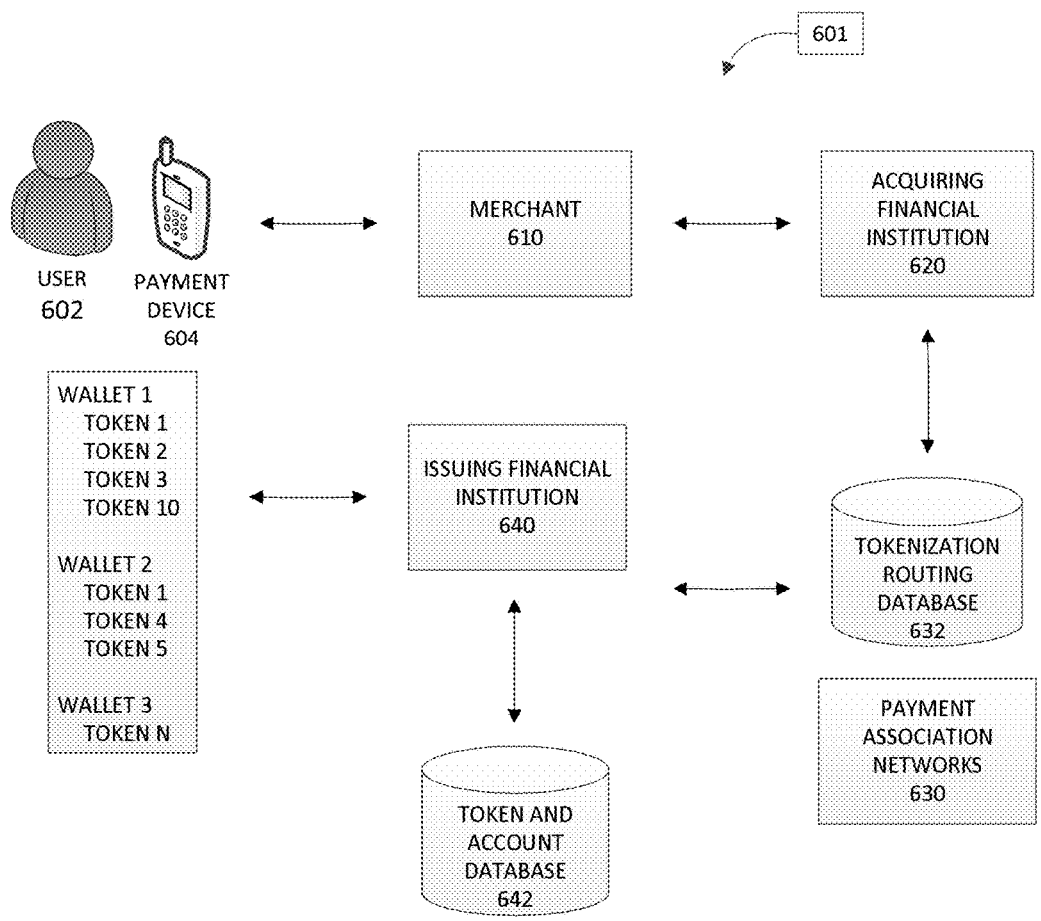
Figure 7:
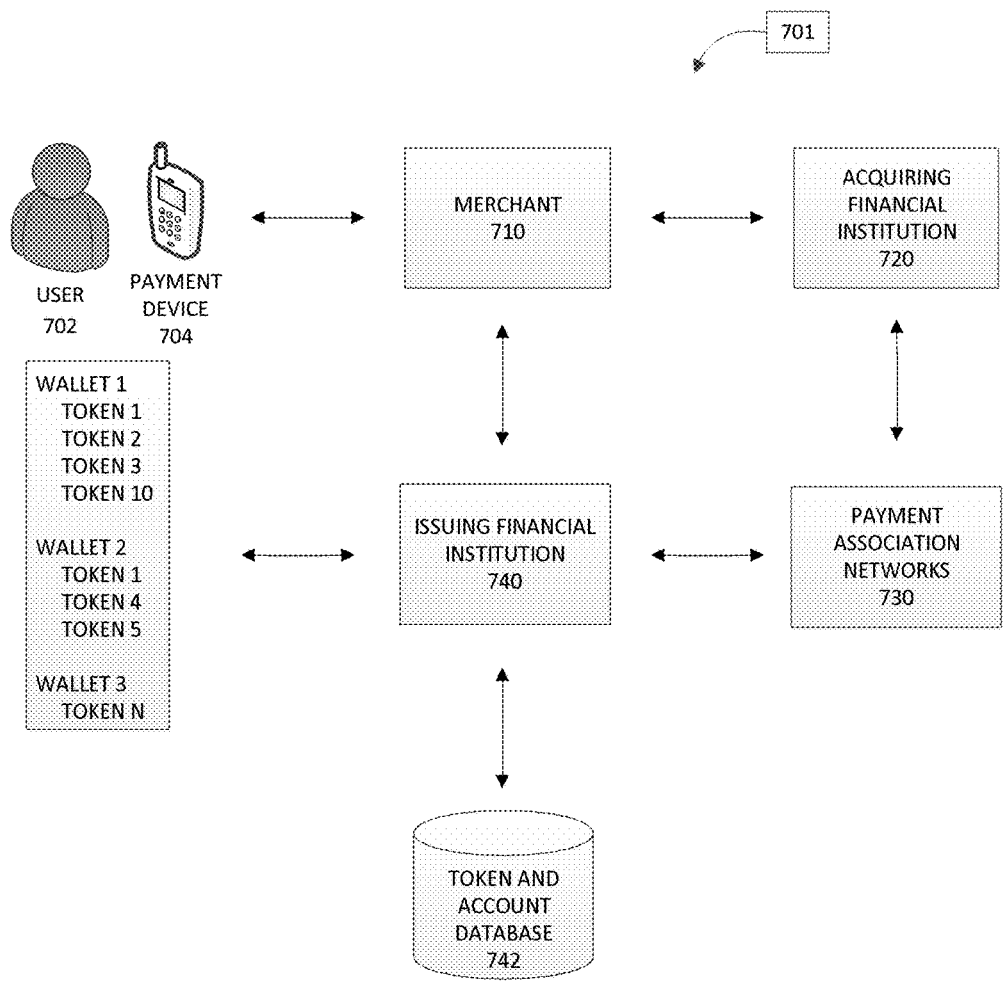

FIGS. 5 through 7 illustrate a number of different ways that the user 502, 602, 702 may use one or more tokens in order to enter into a transaction, as well as how the parties associated with the transaction may process the transaction. FIG. 5, illustrates one embodiment of a token system process 501, wherein the token system process 501 is used in association with a tokenization service 550. The tokenization service 550 may be provided by a third-party institution, the user's financial institution, or another institution involved in a transaction payment process. As illustrated in FIG. 5 (as well as in FIGS. 6 and 7), a user 502 may utilize a payment device 504 (or in other embodiments a payment instrument over the Internet) to enter into a transaction. FIG. 5 illustrates the payment device 504 as a mobile device, such as a smartphone, personal digital assistant, or other like mobile payment device. Other types of payment devices 504 may be used to make payments, such as but not limited to an electronic payment card, key fob, a wearable payment device (e.g., watch, glasses, or the like), or other like payment devices 504. As such, when using a payment device 504 the transaction may be made between the point of sale (POS) and the payment device 504 by scanning information from the payment device 504, using near field communication (NFC) between the POS and the payment device 504, using wireless communication between the POS and the payment device 504, or using another other type of communication between the POS and the payment device 504. When entering into an e-commerce transaction over the Internet, for example using the payment device 4 or another device without a POS, a payment instrument (e.g., a payment application that stores the token) may be used to enter into the transaction. The payment instrument may be the same as the token or digital wallet associated with the payment device 504, except they are not associated with specific payment device. For example, the token or digital wallet may be associated with a payment application that can be used regardless the device being used to enter into the transaction over the Internet.

The token can be associated directly with the payment device 504, or otherwise, through one or more digital wallets associated with the payment device 504. For example, the token may be stored on one or more payment devices 504 directly, and as such any transaction entered into by the user 502 with the one or more payment devices 4 may utilize the token. Alternatively, the payment device 4 may have one or more digital wallets stored on the payment device 504 that allow the user 502 to store one or more user account numbers, or tokens associated with the user account numbers, on the one or more digital wallets. The user may select a digital wallet or account within the digital wallet in order to enter into a transaction using a specific type of customer account. As such, the digital wallets may be associated with the user's issuing financial institutions 540, other financial institutions, merchants 510 with which the user enters into transactions, or a third party institutions that facilitates transactions between users 502 and merchants 510.

As illustrated in FIG. 5, a tokenization service 550 may be available for the user 5022 to use during transactions. As such, before entering into a transaction, the user 502 may generate (e.g., create, request, or the like) a token in order to make a payment using the tokenization service 550, and in response the tokenization service 550 provides a token to the user and stores an association between the token and the user account number in a secure token and account database 552. The token may be stored in the user's payment device 504 (e.g., on the digital wallet) or stored on the cloud or other service through the tokenization service 550. The tokenization service 550 may also store limits (e.g., geographic limits, transaction amount limits, merchant limits, product limits, any other limit described herein, or the like) associated with the token that may limit the transactions in which the user 502 may enter. The limits may be placed on the token by the user 502, or another entity (e.g., client, administrator, person, company, or the like) responsible for the transactions entered into by the user 502 using the account associated with the token. The generation of the token may occur at the time of the transaction or well in advance of the transaction, as a one-time use token or multi-use token.

After or during creation of the token the user 502 enters into a transaction with a merchant 510 using the payment device 504 (or payment instrument over the Internet). In some embodiments the user 502 may use the payment device 504 by itself, or specifically select a digital wallet or user account stored within the digital wallet, to use in order to enter into the transaction. The token associated with payment device, digital wallet, or user account within the wallet is presented to the merchant 510 as payment in lieu of the actual user account number and/or other user account information. The merchant 510 receives the token, multiple tokens, and/or additional user account information for the transaction. The merchant 510 may or may not know that the token being presented for the transaction is a substitute for a user account number or other user account information. The merchant also captures transaction information (e.g., merchant, merchant location, transaction amount, product, or the like) related to the transaction in which the user 502 is entering with the merchant 510.

The merchant 510 submits the token (as well as any user account information not substituted by a token) and the transaction information for authorization along the normal processing channels (also described as processing rails), which are normally used to process a transaction made by the user 502 using a user account number. In one embodiment of the invention the acquiring financial institution 520, or any other institution used to process transactions from the merchant 510, receives the token, user account information, and transaction information from the merchant 510. The acquiring financial institution 520 identifies the token as being associated with a particular tokenization service 550 through the token itself or user account information associated with the token. For example, the identification of the tokenization service 550 may be made through a sub-set of characters associated with the token, a routing number associated with the token, other information associated with the token (e.g., tokenization service name), or the like. The acquiring financial institution 520 may communicate with the tokenization service 550 in order to determine the user account number associated with the token. The tokenization service 550 may receive the token and transaction data from the acquiring financial institution 520, and in response, provide the acquiring financial institution 20 the user account number associated with the token as well as other user information that may be needed to complete the transaction (e.g., user name, issuing financial institution routing number, user account number security codes, pin number, or the like). In other embodiments, if limits have been placed on the token, the tokenization service 550 may determine whether or not the transaction information meets the limits and either allows or denies the transaction (e.g., provides the user account number or fails to provide the user account number). The embodiment being described occurs when the token is actually stored on the payment device 504. In other embodiments, for example, when the actual token is stored in a cloud the payment device 504 may only store a link to the token or other token information that allows the merchant 510 or acquiring financial institution to acquire the token from a stored cloud location.

If the acquiring financial institution 520 receives the user account number from the tokenization service 550 (e.g., the tokenization service indicates that the transaction meets the limits), then the acquiring financial institution 520 thereafter sends the user account number, the other user information, and the transaction information directly to the issuing financial institution 540, or otherwise indirectly through the card association networks 530. The issuing financial institution 540 determines if the user 502 has the funds available to enter into the transaction, and if the transaction meets other limits on the user account, and responds with approval or denial of the transaction. The approval runs back through the processing channels until the acquiring financial institution 520 provides approval or denial of the transaction to the merchant 510 and the transaction between the merchant 510 and the user 502 is completed. After the transaction is completed the token may be deleted, erased, or the like if it is a single-use token, or stored for further use if it is a multi-use token.

Instead of the process described above, in which the acquiring financial institution 20 requests the token from the tokenization service 550, in some embodiments the tokenization service 550 may receive the transaction request and transaction information from the merchant 10 or acquiring financial institution 520. Instead of providing the account number to the acquiring financial institution 520, the tokenization service 550 may send the transaction request and transaction information to the issuing financial institution 540 directly, or indirectly through the payment association networks 530.

The embodiment illustrated in FIG. 5 prevents the user account number and other user information from being presented to the merchant 510; however, the tokenization service 550, acquiring financial institution 520, the card association networks 530, and the issuing financial institution 540 may all utilize the actual user account number and other user information to complete the transaction.

FIG. 6 illustrates another embodiment of a token system process 601, in which the user 602 may utilize a payment device 604 (or payment instrument over the Internet) to enter into transactions with merchants 610 utilizing tokens instead of user account numbers. As illustrated in FIG. 6, the user may have one or more tokens, which may be associated with the payment device 604, one or more digital wallets within the payment device 604, or one or more user accounts associated with the digital wallets. The one or more tokens may be stored in the user's payment device 604 (or on the digital wallet), or stored on a cloud or other service through the issuing financial institution 640 or another institution. The user 602 may set up the digital wallet by communicating with the issuing financial institution 640 (e.g., the user's financial institution) to request a token for the payment device, either for the device itself, or for one or more digital wallets or one or more user accounts stored on the payment device. As previously discussed, a wallet may be specifically associated with a particular merchant (e.g., received from the merchant 610) and include one or more tokens provided by the issuing financial institution 640 directly (or through the merchant as described with respect to FIG. 7). In other embodiments, the issuing financial institution 640 may create the digital wallet for the user 602 (e.g., through a wallet created for a business client or retail client associated with the user 602) and include one or more tokens for various types of transactions, products, or the like. The issuing financial institution 640 may store the tokens, the associated user account information (e.g., including the user account number), and any limits on the use of the tokens, as was previously described with respect to the tokenization service 650 in FIG. 5. In one embodiment the tokens may include user account information or routing information within the token or tied to the token, which allows the merchants 610 and other institutions in the payment processing systems to route the token and the transaction information to the proper institutions for processing. In other embodiments a tokenization routing database 632 may be utilized to determine where to route a transaction using a token, as described in further detail later.

The user 602 may enter into a transaction with the merchant 610 using a payment device 604 (or a payment instrument through the Internet). In one embodiment the user 602 may enter into the transaction with a token associated with the payment device 604 itself (or a payment instrument through the Internet). In other embodiments, a specific digital wallet and/or a specific account within the digital wallet may be selected for a particular merchant with whom the user 602 wants to enter into a transaction. For example, the user 602 may select "wallet 1" to enter into a transaction with "merchant 1" and "token 1" to utilize a specific account. The merchant 610 identifies the token, and sends the token and the transaction information to the acquiring financial institution 620. If the token has routing information the acquiring financial institution 620 may route the token and transaction data to the issuing financial institution 640 directly or through the card association networks 630. In situations where the token does not have associated routing information, the acquiring financial institution 620 may utilize a tokenization routing database 632 that stores tokens or groups of tokens and indicates to which issuing financial institutions 640 the tokens should be routed. One or more of the acquiring financial institutions 620, the card association networks 630, and/or the issuing financial institutions 640 may control the tokenization routing database in order to assign and manage routing instructions for tokenization across the payment processing industry. The tokenization routing database 632 may be populated with the tokens and the corresponding issuing financial institutions 640 to which transactions associated with the tokens should be routed. However, in some embodiments no customer account information would be stored in this tokenization routing database 632, only the instructions for routing particular tokens may be stored.

Once the token and transaction details are routed to the issuing financial institution 640, the issuing financial institution 620 determines the user account associated with the token through the use of the token account database 642. The financial institution determines if the funds are available in the user account for the transaction and if the transaction information meets other limits by comparing the transaction information with the limits associated with the token, the user account associated with the token, or other limits described herein. If the transaction meets the limits associated with the token or user account, then the issuing financial institution 620 allows the transaction. If the transaction information does not meet one or more of the limits, then the issuing financial institution 620 denies the transaction. The issuing financial institution sends a notification of the approval or denial of the transaction back along the channels of the transaction processing system to the merchant 610, which either allows or denies the transaction.

The embodiment illustrated in FIG. 6 allows the user and the financial institution to shield the user's account number and other user information from all of the entities in the payment processing system because the merchant 610, acquiring merchant bank 620, payment association networks 630, or other institutions in the payment processing system only use the token and/or other shielded user information to process the transaction. Only the issuing financial institution 640 has the actual account number of the user 602.

FIG. 7 illustrates another embodiment of the token system process 701, in which the user 702 may utilize a payment device 704 (or payment instrument over the Internet) to enter into transactions with a merchant 710 utilizing a token instead of a user account number and/or other user account information. As illustrated in FIG. 7, the user 702 may have one or more tokens associated with the payment device 702, the one or more digital wallets, or one or more user accounts within the digital wallets. The one or more tokens may be stored in the user's payment device 704 (or within the digital wallet), or stored on a cloud or other service through the issuing financial institution 740 or another institution. The user 702 may set up the digital wallet by communicating with the issuing financial institution 740 (e.g., the user's financial institution) and/or the merchant 710 to request a token for the payment device 4, either for the payment device 704 itself, for the one or more digital wallets stored on the payment device 704, or for user accounts within the digital wallet. The financial institution 740 may have a dedicated group of tokens that are associated with a specific merchant, and as such the merchant 710 and the issuing financial institution 740 may communicate with each other to provide one or more tokens to the user 702 that may be specifically associated with the merchant 710. For example, the issuing financial institution may provide a set of tokens to "merchant 1" to associate with "wallet 1" that may be used by one or more users 702. As such "Token 10" may be associated with "wallet 1" and be specified only for use for transactions with "merchant 1."

The merchant 710 may provide the specific tokens from the financial institution 740 to the user 702, while the financial institution 740 may store the user account information with the token provided to the user 702. The financial institution may communicate directly with the user 702, or through the merchant 710 in some embodiments, in order to associate the token with the user 702. Since the merchant 710 provides, or is at least notified by the financial institution 740, that a specific token, or groups of tokens, are associated with a specific issuing financial institution 740, then the merchant 710 may associate routing information and transaction information with the token when the user 2 enters into a transaction with the merchant 710 using the token.

The merchant 710 passes the token (and potentially other user account information), routing information, and transaction information to the acquiring financial institution 720 using the traditional payment processing channels. The acquiring financial institution 720, in turn, passes the token (and potentially other user account information) and transaction information to the issuing financial institution 740 directly, or indirectly through the payment association networks 730 using the routing information. The issuing financial institution 740 accesses the token and account database 742 to identify the user account associated with the token and determines if the transaction information violates any limits associated with the token or the user account. The issuing financial institution 740 then either approves or denies the transaction and sends the approval or denial notification back through the payment processing system channels to the merchant 710, which then notifies the user 702 that the transaction is allowed or denied.

As is the case with the token system process 601 in FIG. 6, the token system process 701 in FIG. 7 allows the user 702 and the financial institution 740 to shield the user's account number and other user information from all of the entities in the payment processing system because the merchant 710, acquiring merchant bank 720, payment association networks 730, or other institutions in the payment processing system only use the token and/or other shielded user information to process the transaction. Only the issuing financial institution 40 has the actual account number of the user 702.

The embodiments of the invention illustrated in FIGS. 5 through 7 are only example embodiments of the invention, and as such it should be understood that combinations of these embodiments, or other embodiments not specifically described herein may be utilized in order to process transactions between a user 702 and merchant 710 using one or more tokens as a substitute for user account numbers or other user account information, such that the merchant 710, or other institutions in the payment processing system do not have access to the actual user accounts or account information.

As briefly discussed above, if the issuing financial institution 740 creates the digital wallet not only does the issuing financial institution 740 receive transaction information along the normal processing channels, but the financial institution 750 may also receive additional transaction information from the user 702 through the digital wallet using the application program interfaces (APIs) or other applications created for the digital wallet. For example, geographic location information of the user 702, dates and times, product information, merchant information, or any other information may be transmitted to the issuing financial institution 740 through the APIs or other applications to the extent that this information is not already provided through the normal transaction processing channels. This additional transaction information may assist in determining if the transactions meet or violate limits associated with the tokens, user accounts, digital wallets, or the like.

Alternatively, if the merchant 710 or another institution, other than the issuing financial institution 740, provides the digital wallet to the user 702, the issuing financial institution 740 may not receive all the transaction information from the traditional transaction processing channels or from the digital wallet. As such, the issuing financial institution 740 may have to receive additional transaction information from another application associated with the user 702 and compare the transaction information received through the traditional channels in order to associate the additional information with the transaction. In other embodiments, the issuing financial institutions 740 may have partnerships with the merchants 710 or other institutions to receive additional transaction information from the digital wallets provided by the merchants or other institutions when the users 702 enter into transactions using the digital wallets.

Moreover, when there is communication between the digital wallets of the users 702 and the issuing financial institution 40 or another institution, transactions in which the user 702 may enter may be pre-authorized (e.g., pre-qualified) to determine what accounts (e.g., tokens) may be used to complete the transaction, without having to arbitrarily choose an account for the transaction. In the case when there are multiple digital wallets or multiple accounts, the account that is pre-authorized or the account that provides the best rewards may be automatically chosen to complete the transactions.

Additional embodiments of the invention will now be described in further detail in order to provide additional concepts and examples related to how tokens may be utilized in these illustrated token system processes 501, 601, 701 or in other token system processes not specifically described in FIGS. 5 through 7.

Data Rotation Through Tokenization

Embodiments of the invention provide for electronic processing of a physical transaction instrument (such as a check) using an electronic system. The system uses a tokenized PIN to authenticate a check at a point of sale (POS) either utilizing existing POS readers or modified readers configured to enable recognition of a check's number to be read then authenticated with a "rotating" or changing PIN.

In general, checks associated with this invention have no value even if they have a "valid" signature on them, but rather, they are only valuable when a holder (i.e., the signee), can provide a valid PIN associated with the check as well. A user may enter a PIN locally using the POS or a system for accepting debit card PINs. Alternatively, a user may enter a PIN using his or her mobile device via mobile app, text message, SMS message or by phone call during the transaction. Each check may have one or more valid PINs associated with it and/or a group of checks may have a common PIN or PINs that are valid. This system allows for a customer of a financial institution to send a check to someone to use without fear of compromising all their other checks. The PIN may be changed using a mobile device via mobile app, phone call, using online banking or the like.

In some cases, a customer would like to issue additional "second" tokenized PINs. Such second PINs may be helpful in protecting the elderly, dependents, special needs or other client from misuse or stolen checks. Other uses of a second PIN may be for a guardian, power of attorney, government agency (e.g., in the case of a government instrument) or the like.

In some embodiments, a check may be printed utilizing the mobile check generator as described above with reference to FIGS. 1-4. In other cases, a check may be an on-demand use check or standard pre-printed checks may be used in the system.

Figure 8:
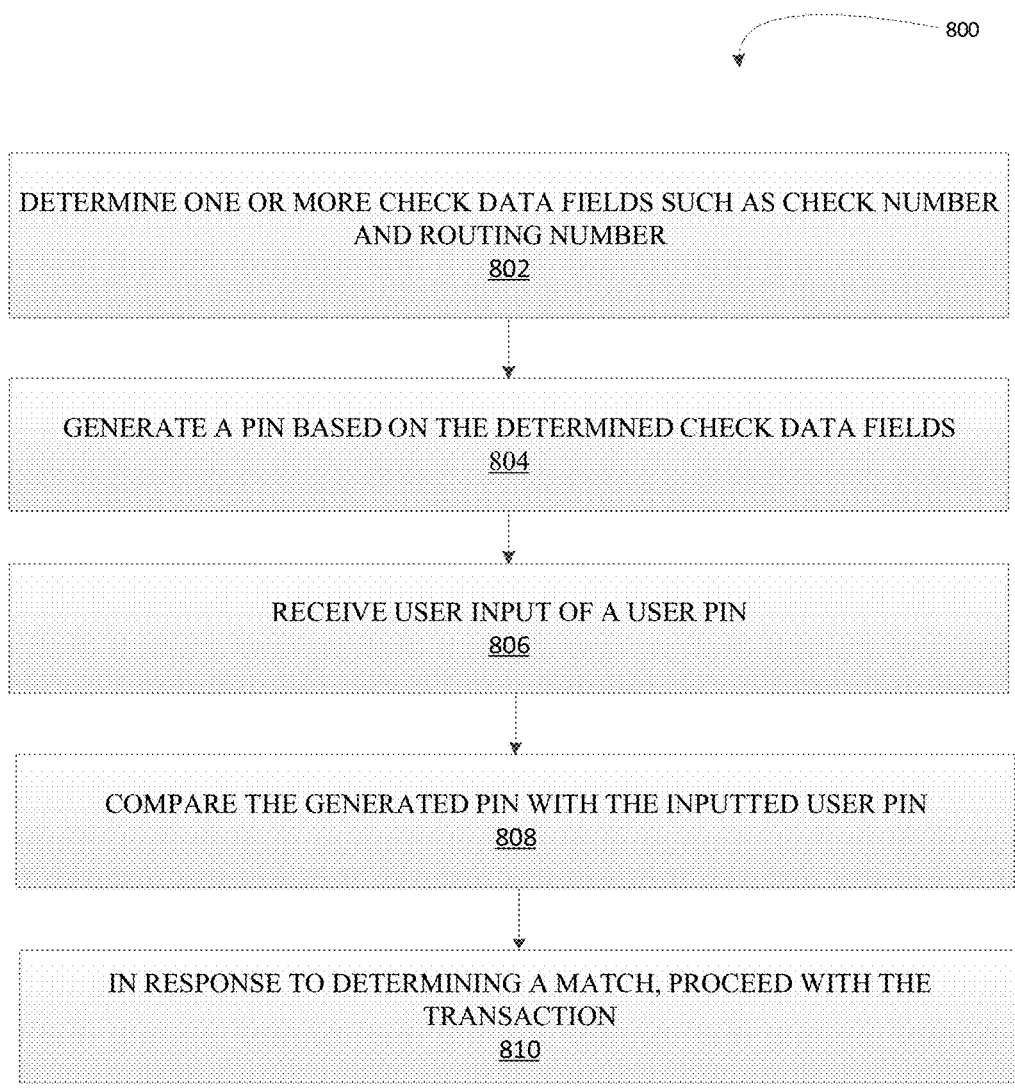
FIG. 8 is a flowchart illustrating a method for data rotation through tokenization.

Referring now to FIG. 8, a method 800 for data rotation by tokenization is illustrated. The first step, represented by block 802, is to determine one or more check data fields such as check number and/or routing number. Other fields may also be used. The next step, represented by block 804, is to generate a PIN based on the determined check data fields. Generation of the PIN may include applying an algorithm such as a hash and/or otherwise to "encode" or tokenize the PIN so that the system will recognize the user inputted PIN. Alternatively, the user inputted PIN may be "decoded" or de-tokenized so that the two PINs may be compared. In yet other embodiments, an algorithm or multiple algorithms are applied to one or both the PINs so that they may be compared accurately. In some embodiments, however, the PIN is not necessarily generated, but rather, the system merely takes one or more pieces of data from the scanned check and looks up the data in a database table to match the data with the corresponding PIN (or a tokenized version of the PIN).

The next step, represented by block 806, is to receive user input of a user PIN. This PIN may be supplied by the user using his or her mobile device, such as by way of a mobile app, text message, phone call, email or otherwise, or may be input into a keypad that is part or separate from the POS.

The next step, represented by block 808, is to compare the generated PIN with the inputted user PIN, and finally, as represented by block 810, the last step is to proceed, in response to determining a match, with the transaction. The comparison of PINs, as noted above may involve conversion of one or more of the PINs into the same format by application of one or more algorithms to the input PIN and/or the generated or retrieved PIN.

In various embodiments, the PINs are constantly, regularly or periodically changed. In other words, the underlying PIN associated with a payment instrument may be the same, but an algorithm for creating a tokenized PIN may regularly result in a different tokenized PIN. For example, the algorithm may calculate a different tokenized PIN every ten (10) seconds when it is applied to the underlying PIN. In some such cases, the user may carry a keyfob that calculates a PIN and/or use a mobile app that calculates a PIN. Furthermore, in some cases, the user must input one or more of a password (that is not dynamic, but may in some cases, be changed manually), a fixed portion of the PIN (that is also not dynamic, but that may in some cases be changed manually), and/or a dynamic or "rotating" PIN that is calculated based on an applied algorithm as noted above.

In various embodiments, the instrument (e.g., check) may include electronics or other components (e.g., magnetic components such as a magnetic strip, RFID or otherwise) that may be read by a POS device or otherwise (similar to the way a credit card or debit card magnetic strip or chip are read) in order to determine the appropriate PIN to be entered in order to complete a transaction using the check. In various embodiments, the check includes a PIN generator that applies the algorithm(s) to generate the PIN so that the POS or other reader receives a PIN that has been dynamically generated, and the user, in order to provide a valid PIN to use the check, must use a keyfob, mobile app or other PIN generator to generate the user inputted PIN that will validate with the check PIN.

More specifically, embodiments rotate data by tokenization. Embodiments determine one or more check data fields of a check such as check number and routing number; generate a PIN based on the determined check data fields; receive user input of a user PIN; compare the generated PIN with the inputted user PIN; if the generated PIN matches the inputted user PIN, proceed with the transaction; and if the generated PIN does not match the inputted user PIN, cancel the transaction. In some cases, a point of sale terminal comprising a scanner for scanning the check to determine the one or more check data fields. In some cases, receiving user input of the user PIN comprises receiving, by a communication device of the system from a mobile device of the user, a text message, SMS message or phone call comprising the user input of a user PIN.

In some cases, generating a PIN comprises applying a unique hash to the check number and/or the routing number, resulting in a hashed result. In some such cases, generating a PIN further comprises comparing the hashed result to a table of hashed results to determine the generated PIN.

In some cases, embodiments also receive a PIN change request from the user; update a table of PINs with a new PIN based on the PIN change request; and transmit a successful PIN change message to the user. In some cases, embodiments receive user input requesting one or more second user PINs; and update a PIN table to associate the one or more second user PINs with one or more checks, wherein the one or more checks were previously associated with at least one first PIN.

In some cases, a mobile device of the user includes a digital wallet module stored in a memory, comprising executable instructions that when executed by a processor cause the processor to receive a request, from the user, to perform a transaction with a merchant; generate a virtual check comprising a checking account number, a bank routing number, and a date; and initiate display of the virtual check on a display of the mobile device. In some such cases, the digital wallet module stored in a memory, further comprises executable instructions that when executed by a processor cause the processor to receive input from the user corresponding to at least one of a plurality of check fields; and populate the virtual check based on the received input.

In various embodiments, a dual- or multiple-PIN authentication is required before a check is authorized for a transaction according to this system. The dual-PIN authentication may require not only a PIN entry from the customer or owner of the account the check is drawing from but also from a person holding the check, for example, an agent of the customer who is attempting to use the check in a transaction where the customer is not present. For example, if the customer gives a check to a family member for use and provides a "secondary" PIN to the family member, when a POS validates the secondary PIN, the system will then communicate with the customer, such as via mobile device app, text message, email, or online banking message, in order to receive and validate the customer's PIN in addition to the secondary PIN. In this regard, three, four or more PINs could be authenticated to continue to build on the level of security provided for a particular check and transaction.

One advantage of this system is that it provides the receiving party with assurances that the check is valid, the money to pay for the check is available and that when the receiving party cashes the check, they will receive the funds owing to them. In other words, this system alleviates the problem where checks are used for a transaction and there is inadequate money in the bank account to be drawn. Of course, this system also minimizes or eliminates check fraud by implementing a system whereby a check is no accepted as a payment instrument unless one or more required PINs are entered and validated.

CONCLUSION

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for data rotation through tokenization, the system comprising:
one or more processors; and
one or more non-transitory computer-readable memories;
computer-executable instructions stored within the one or more non-transitory computer-readable memories, that when executed by the one or more processors, cause the system to:
determine one or more check data fields, including at least a check account number and a bank routing number;
generate a PIN;
associate the generated PIN with the one or more check data fields;
in response to initiating a transaction with a merchant, generate and display, on a mobile device of a user, a virtual check with the one or more check data fields including at least the check account number and the bank routing number;
receive a user PIN;
compare the generated PIN with the user PIN;

if the generated PIN matches the user PIN, proceed with the transaction; and
if the generated PIN does not match the user PIN, cancel the transaction.

2. The system of claim 1, wherein the transaction is initiated at a point of sale terminal comprising a scanner for scanning the virtual check to determine the one or more check data fields.

3. The system of claim 1, wherein receiving the user PIN comprises receiving the user PIN captured from the mobile device of the user, a text message, SMS message or phone call comprising the user PIN.

4. The system of claim 1, wherein generating the PIN comprises applying a unique hash to the check account number and/or the bank routing number, resulting in a hashed result.

5. The system of claim 4, wherein generating the PIN further comprises comparing the hashed result to a table of hashed results to determine the PIN.

6. The system of claim 1, wherein the computer-executable instructions comprise further instructions, that when executed by the one or more processors, cause the system to:
receive a PIN change request from the user;
update a table of PINs with a new PIN based on the PIN change request; and
transmit a successful PIN change message to the user.

7. The system of claim 1, wherein the computer-executable instructions comprise further instructions, that when executed by the one or more processors, cause the system to:
receive user input requesting one or more second user PINs;
update a PIN table to associate the one or more second user PINs with one or more checks, wherein the one or more checks were previously associated with at least one first PIN.

8. The system of claim 1, wherein the mobile device of the user comprises a digital wallet module stored in a memory of the mobile device, and wherein the memory stores the virtual check.

9. The system of claim 8, wherein the digital wallet module stored in the memory, further comprises executable instructions that when executed by a processor of the mobile device cause the processor to:
receive input from the user corresponding to at least one of a plurality of check fields; and
populate the virtual check based on the input received.

10. A computer program product for data rotation through tokenization, the computer program product comprising a non-transitory computer-readable medium comprising code causing one or more processors of a system to:
determine one or more check data fields, including at least a check account number and a bank routing number;
generate a PIN;
associate the generated PIN with the one or more check data fields;
in response to initiating a transaction with a merchant, generate and display, on a mobile device of a user, a virtual check with the one or more check data fields including at least the check account number and the bank routing number;
receive a user PIN;
compare the generated PIN with the user PIN;
if the generated PIN matches the user PIN, proceed with the transaction; and
if the generated PIN does not match the user PIN, cancel the transaction.

11. The computer program product of claim 10, wherein the transaction is initiated at a point of sale terminal comprising a scanner for scanning the virtual check to for determining the one or more check data fields.

12. The computer program product of claim 10, wherein the user PIN comprises receiving the user PIN captured from the mobile device of the user, a text message, SMS message or phone call comprising the user PIN.

13. The computer program product of claim 10, wherein generating the PIN comprises applying a unique hash to the check account number and/or the bank routing number, resulting in a hashed result.

14. The computer program product of claim 13, wherein generating the PIN further comprises comparing the hashed result to a table of hashed results to determine the PIN.

15. The computer program product of claim 10, wherein the computer-readable medium comprises further code, that when executed cause the one or more processors of the system to:
receive a PIN change request from the user;
update a table of PINs with a new PIN based on the PIN change request; and
transmit a successful PIN change message to the user.

16. The computer program product of claim 10, wherein the computer-readable medium comprises further code, that when executed cause the one or more processors of the system to:
receive user input requesting one or more second user PINs;
update a PIN table to associate the one or more second user PINs with one or more checks, wherein the one or more checks were previously associated with at least one first PIN.

17. A computer-implemented method for data rotation through tokenization, the method comprising:
determining, by one or more processors, one or more check data fields, including at least a check account number and a bank routing number;
generating, by the one or more processors, a PIN;
associating, by the one or more processors, the generated PIN with the one or more check data fields;
in response to initiating a transaction with a merchant, generating and displaying, by the one or more processors, on a mobile device of the user, a virtual check with the one or more check data fields including at least the check account number and the bank routing number;
receiving, by the one or more processors, a user PIN;
comparing, by the one or more processors, the generated PIN with the user PIN;
if the generated PIN matches the user PIN, proceeding, by the one or more processors, with the transaction; and
if the generated PIN does not match the user PIN, cancelling, by the one or more processors, the transaction.

18. The method of claim 17, wherein the transaction is initiated at a point of sale terminal comprising a scanner for scanning the virtual check to determine the one or more check data fields.

19. The method of claim 17, wherein receiving the user PIN comprises receiving the user PIN captured from the mobile device of the user, a text message, SMS message or phone call comprising the user PIN.

20. The method of claim 17, wherein generating the PIN comprises applying a unique hash to the check account number and/or the bank routing number, resulting in a hashed result.

* * * * *